US009527486B2

(12) United States Patent
Maruo et al.

(10) Patent No.: US 9,527,486 B2
(45) Date of Patent: Dec. 27, 2016

(54) BRAKE DEVICE

(71) Applicant: Hitachi Automotive Systems, Ltd., Hitachinaka-shi, Ibaraki (JP)

(72) Inventors: Ryohei Maruo, Kawasaki (JP); Masayuki Saito, Sagamihara (JP); Chiharu Nakazawa, Kawasaki (JP); Toshiya Oosawa, Yokohama (JP); Asahi Watanabe, Kawasaki (JP); Hiroki Sonoda, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/651,848

(22) PCT Filed: Dec. 9, 2013

(86) PCT No.: PCT/JP2013/082922
§ 371 (c)(1),
(2) Date: Jun. 12, 2015

(87) PCT Pub. No.: WO2014/092036
PCT Pub. Date: Jun. 19, 2014

(65) Prior Publication Data
US 2015/0314765 A1 Nov. 5, 2015

(30) Foreign Application Priority Data

Dec. 14, 2012 (JP) ................................. 2012-273794

(51) Int. Cl.
*B60T 13/66* (2006.01)
*B60T 7/04* (2006.01)
(Continued)

(52) U.S. Cl.
CPC .................. *B60T 7/042* (2013.01); *B60T 8/17* (2013.01); *B60T 8/4081* (2013.01); *B60T 8/4827* (2013.01);
(Continued)

(58) Field of Classification Search
CPC ...... B60T 7/042; B60T 13/146; B60T 13/686; B60T 17/221
(Continued)

(56) References Cited

U.S. PATENT DOCUMENTS 6,464,307 B1* 10/2002 Yoshino .................. B60T 7/042
303/11
2001/0006306 A1* 7/2001 Kagawa .................. B60T 8/367
303/20
(Continued)

FOREIGN PATENT DOCUMENTS

JP 2001-213295 A 8/2001
JP 2008-254466 A 10/2008
(Continued)

OTHER PUBLICATIONS

International Search Report (PCT/ISA/210) dated Mar. 18, 2014, with English translation (Five (5) pages).

*Primary Examiner* — Christopher Schwartz
(74) *Attorney, Agent, or Firm* — Crowell & Moring LLP

(57) ABSTRACT

The present invention provides a brake device that can improve the pressure-increasing response of wheel cylinder hydraulic pressure. The invention is provided with: a master cylinder (5) actuated by the driver operating the brake, the master cylinder (5) being connected to a wheel cylinder (8) via a first oil channel (11), and capable of increasing the wheel cylinder hydraulic pressure; and an auxiliary pressure-increasing part (auxiliary pressure-increasing part (106) and stroke simulator (27)) for assisting in the increas-
(Continued)

ing of the wheel cylinder hydraulic pressure by the master cylinder (5) of the pump (7).

17 Claims, 13 Drawing Sheets

(51) Int. Cl.
*B60T 8/40* (2006.01)
*B60T 8/48* (2006.01)
*B60T 13/14* (2006.01)
*B60T 13/68* (2006.01)
*B60T 8/17* (2006.01)

(52) U.S. Cl.
CPC ............ *B60T 13/146* (2013.01); *B60T 13/662* (2013.01); *B60T 13/686* (2013.01)

(58) Field of Classification Search
USPC .................... 303/3, 11, 15, 20, 115.4, 116.1, 116.2, 303/114.1
See application file for complete search history.

(56) References Cited

U.S. PATENT DOCUMENTS

| | | | |
|---|---|---|---|
| 2007/0132312 A1* | 6/2007 | Ajiro | B60T 8/172 303/155 |
| 2008/0179145 A1* | 7/2008 | Miyazaki | B60T 7/042 188/151 R |
| 2010/0062897 A1 | 3/2010 | Nishino et al. | |
| 2011/0184620 A1* | 7/2011 | Kato | B60T 8/3275 701/70 |
| 2012/0169112 A1 | 7/2012 | Jungbecker et al. | |
| 2012/0256477 A1* | 10/2012 | Miyazaki | B60T 8/4081 303/6.01 |
| 2015/0367828 A1* | 12/2015 | Oosawa | B60T 17/221 303/6.01 |

FOREIGN PATENT DOCUMENTS

| | | |
|---|---|---|
| JP | 2009-248834 A | 10/2009 |
| JP | 2010-38169 A | 2/2010 |
| JP | 2010-64652 A | 3/2010 |
| WO | WO 2011/029812 A1 | 3/2011 |
| WO | WO 2011/086607 A1 | 7/2011 |

* cited by examiner

BRAKE DEVICE

TECHNICAL FIELD

This invention relates to a brake device mounted on a vehicle.

BACKGROUND ART

Conventionally, there is known a brake device which is provided with a brake device including master cylinders and a pump which serve as hydraulic pressure sources arranged to increase a wheel cylinder hydraulic pressure.

PRIOR ART DOCUMENT

Patent Document

Patent Document 1: WO 2011/029812

SUMMARY OF THE INVENTION

Problems which the Invention is Intended to Solve

However, in the conventional brake device, a response of increasing the wheel cylinder hydraulic pressure may become insufficient.

It is, therefore, an object of the present invention to provide a brake device devised to improve a pressure increasing response of the wheel cylinder hydraulic pressure.

Means for Solving the Problem

The brake device according to the present invention includes an auxiliary pressure increasing section arranged to assist a pressure increase of the wheel cylinder by a master cylinder or a pump.

Benefit of the Invention

By this invention, it is possible to improve the pressure increasing response of the wheel cylinder hydraulic pressure.

BRIEF DESCRIPTION OF DRAWINGS

FIG. 4 is a view showing an actuation state at a depression force brake of the brake device according to the first embodiment.

FIG. 12 is a schematic configuration view showing a brake device according to a second embodiment.

DESCRIPTION OF EMBODIMENTS

Hereinafter, embodiments to attain a brake device according to the present invention are illustrated with reference to the drawings.

First Embodiment

Structure

Figure 1:
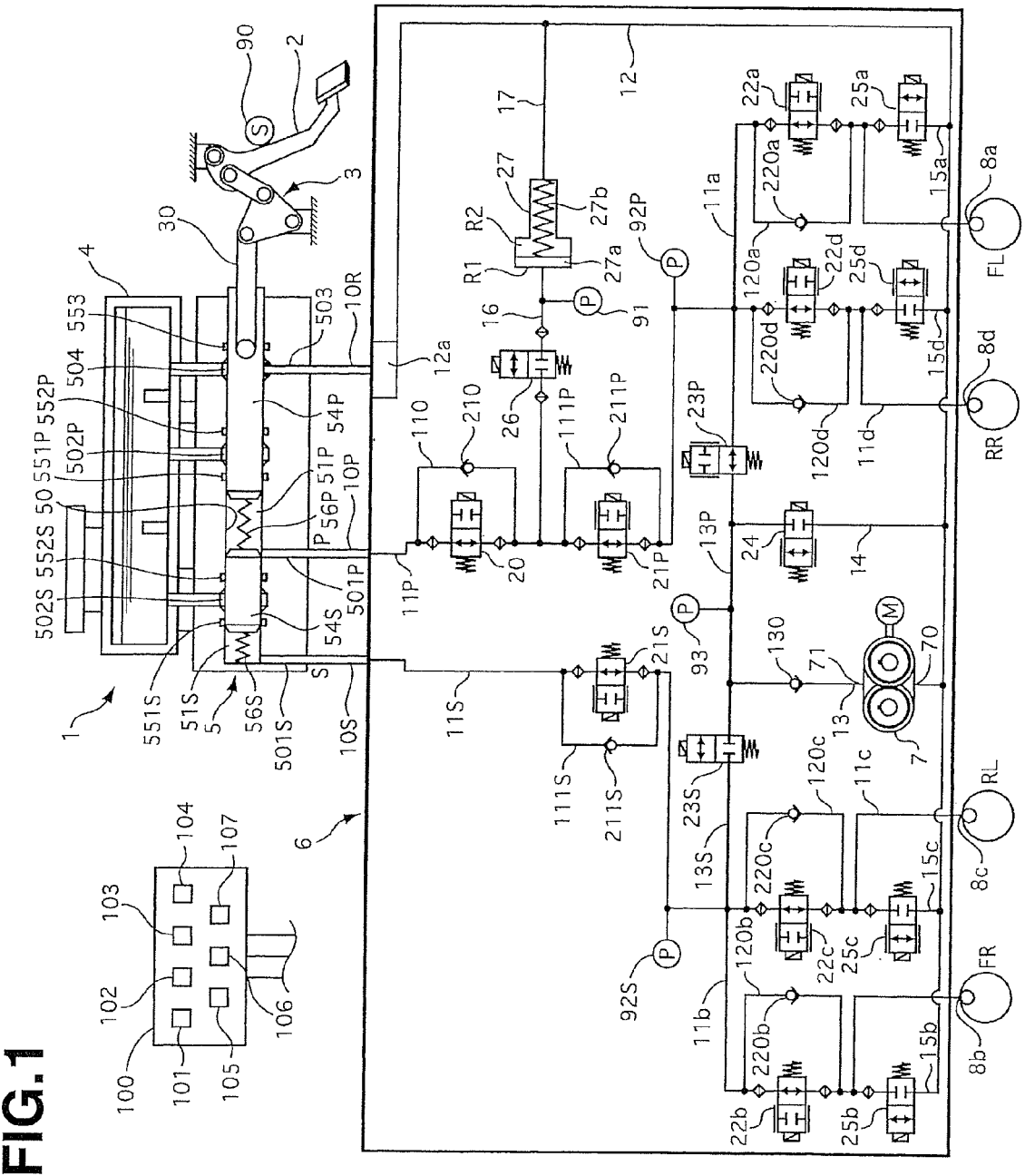
FIG. 1 is a schematic configuration view showing a brake device according to a first embodiment.

First, a structure is illustrated. FIG. 1 is a view showing a schematic view of a brake device (hereinafter, referred to as a device 1) according to a first embodiment. The master cylinder 5 is shown in an axial sectional surface (a partial section which is cut by a plane passing through an axis). The device 1 is a hydraulic pressure brake device which is applied to a brake system of an electric vehicle such as a hybrid vehicle provided with an electric motor (generator) as a prime mover (motor) driving wheels, and an electric automobile provided only with an electric motor (generator). This electric vehicle can perform a regenerative braking to brake the vehicle by regenerating a motion energy (kinetic energy) of the vehicle to into an electric energy, by a regenerative braking device including a motor (generator). The device 1 supplies a brake fluid which is an operation fluid to brake operation units provided to wheels FL-RR of the vehicle. With this, the device 1 generates the brake hydraulic pressure (the wheel cylinder hydraulic pressure) to provide the hydraulic pressure braking force to the wheels.

The brake operation (actuation) units including wheel cylinders of at least front wheels FL and FR is, that is, a disk type including a brake disc which is a brake rotor rotating as a unit with a tire, and a caliper (hydraulic pressure type brake caliper) including a brake pad which is disposed with a predetermined clearance (gap or buka) with respect to the brake disc, and which is arranged to be moved by the wheel cylinder hydraulic pressure to contact on the brake disc to generate the braking force.

Besides, for example, the rear wheels RL and RR may be a drum type brake operation (actuation unit). The device 1 includes 2 system brake pipes (a primary P system and a secondary S system). For example, the device 1 employs X-piping system. Besides, the device 1 may employ other piping system such as front and rear piping. Hereinafter, when members provided to correspond to the P system and the members provided to correspond to the S system are distinguished, affixes P and S are adhered to respective symbols.

The device 1 includes a brake pedal 2 which is a brake operation member arranged to receive an input of the brake operation of the driver; a link mechanism 3 arranged to vary a variation rate of the brake operation force (the depression force of the brake pedal 2) to the operation amount (the pedal stroke) of the brake pedal 2 by the driver; a reservoir tank (hereinafter, referred to as a reservoir) 4 which is a fluid source storing the brake fluid, and which is a low pressure portion opened to atmosphere pressure; a master cylinder 5 which is connected through the link mechanism 3 to the brake pedal 2, which is supplied with the brake fluid from the reservoir 4, and which is arranged to be actuated by an operation (a brake operation) of the brake pedal 2 by the driver, and to generate the brake hydraulic pressure (the master cylinder pressure); a hydraulic pressure unit (brake control unit) 6 which is arranged to be supplied with the brake fluid from the reservoir 4 or the master cylinder 5, and to generate the brake hydraulic pressure independently of the brake operation of the driver; and an electric control unit (hereinafter, referred to as ECU) 100 configured to control the operation (actuation) of the hydraulic pressure unit 6. The brake pedal 2 is provided with a pedal stroke sensor 90 arranged to sense a pedal stroke.

The device 1 is not provided with a negative pressure booster arranged to increase or amplify (boost) the brake operation force (the pedal depression force) by using a suction negative pressure generated by the engine of the vehicle. The link mechanism 3 is a depression force amplifying mechanism provided between the brake pedal 2 and the master cylinder 5. A link member on the input side is rotatably connected to the brake pedal 2. A link member on the output side is rotatably connected to the push rod 30. The master cylinder 5 is a tandem type. The master cylinder 5 includes, as a master cylinder piston which is moved in the axial direction in accordance with the brake operation of the driver, a primary piston 54P connected to the push rod 30, and a secondary piston 54S which is a free piston type.

The hydraulic pressure unit 6 is provided between the wheel cylinder 8 and the master cylinder 5. The hydraulic pressure unit 6 can independently supply the master cylinder pressure or the control hydraulic pressure to the wheel cylinders 8. The hydraulic pressure unit 6 includes a pump 7 and a plurality of control valves (electromagnetic valves 20 and so on) which serves as a hydraulic pressure device (actuator) arranged to generate a control hydraulic pressure. The pump 7 is arranged to be rotationally driven by the motor M to suck the brake fluid within the reservoir 4, and to discharge the brake fluid to the wheel cylinders 8. In this embodiment, the pump 7 is a gear pump which has a good noise and vibration characteristic and son on, specifically, an external gear pump. The pump 7 is used in the both systems. The pump 7 is driven by the same motor M. The motor M can be, for example, a motor with a brush. The electromagnetic valves 20 and so on is arranged to be opened and closed in accordance with a control signal, and thereby to control a flow of the brake fluid. The hydraulic pressure unit 6 is arranged to increase the pressures of the wheel cylinders 8 in accordance with the brake operation of the driver in a state where the master cylinder 5 and the wheel cylinders 8 are shut off with each other. Moreover, the hydraulic pressure unit 6 includes a stroke simulator 27 arranged to generate a pedal stroke by the brake fluid flowing from the master cylinder 5 into the stroke simulator 27 in accordance with the brake operation of the driver. Moreover, the hydraulic pressure unit 6 includes hydraulic pressure sensors 91-93 arranged to sense a discharge pressure of the pump 7, and the master cylinder pressure.

The ECU 100 is arranged to receive detection values transmitted from the pedal stroke sensor 90 and the hydraulic pressure sensors 91-93, and information which relates to a running state, and which is transmitted from the vehicle. The ECU 100 is arranged to control the actuators of the hydraulic pressure unit 6 based on the installed program. In particular, the ECU 100 controls the opening and closing operations of the electromagnetic valve 20 and so on which is arranged to switch the connection states of the hydraulic passages, and the rotation speed of the motor M which is arranged to drive the pump 7 (that is, the discharge amount of the pump 7). With this, the ECU 100 is perform a boost control to decrease the brake operation force, an antilock brake control (hereinafter, referred to as ABS) to suppress the slip of the wheels by the brake, and a brake control for performing a motion control of the vehicle (vehicle behavior stabilizing control of a anti-skid control and so on, hereinafter, referred to as VDC), an automatic brake control such as a proceeding vehicle following control and so on, and a regenerative cooperative brake control configured to control the wheel cylinder hydraulic pressures to attain the target deceleration (the target braking force) in cooperation with the regenerative brake. The boost control is configured to drive the hydraulic pressure unit 6 (by using the discharge pressure of the pump 7) at the brake operation of the driver, to thereby generate the hydraulic braking force which is sufficient by the brake operation force of the driver). With this, the boost function to assist the brake operation is attained. That is, in place of providing the engine negative pressure booster, the hydraulic pressure unit 6 (the pump 7) is operated to assist the brake operation force. The regenerative cooperative brake control is configured to generate, for example, the hydraulic pressure braking force which is insufficient by the regenerative braking force by the regenerative braking device so as to generate the braking force which is required by the driver.

The master cylinder 5 is a first hydraulic pressure source which is connected through a first hydraulic passage 11 (described later) to the wheel cylinder 8, and which is arranged to increase the wheel cylinder hydraulic pressure. The master cylinder 5 is arranged to increase the pressures of the wheel cylinders 8a and 8d through the hydraulic passage (the first hydraulic passage 11P) of the P system by the master cylinder pressure generated in the first hydraulic chamber 51P, and to increase the pressures of the wheel cylinders 8b and 8c through the hydraulic passage (the first hydraulic passage 11S) of the S system by the master cylinder pressure generated by the second hydraulic chamber 51S. The pistons 54P and 54S are arranged to inserted (into the bottomed cylindrical cylinder 50) so as to be moved along the inner circumference surface of the cylinder 50 in the axial direction. The cylinder 50 includes a discharge port (supply port) 501 connected to the hydraulic pressure unit 6 to be connected with the wheel cylinders 8; and a resupply port 502 which is connected with the reservoir 4, and which is connected with the reservoir 4. The discharge port 501 and the resupply port 502 are provided at each of the P system and the S system. Moreover, the cylinder 50 includes a suction port 503 which is connected with the hydraulic pressure unit 6, and which is connected with the suction portion 70 of the pump 7; and a resupply port 504 which is connected with the reservoir 4, and which is connected with the reservoir 4. A coil spring 56P which is a return spring is disposed in the first fluid chamber 51P between the pistons 54P and 54S in a state where the coil spring 56P is compressed. A coil spring 56S is disposed in a compressed state in the second fluid chamber 51S between the piston 51P and an axial end portion of the cylinder 50. The discharge port 501 is always opened to the first and second fluid chambers 51P and 51S. The resupply port 504 is always connected to the suction port 503.

Piston seals 55 are disposed on an inner circumference of the cylinder 50. The piston seals 55 are a plurality of seal members arranged to seal between the outer circumference surfaces of the pistons 54P and 54S and the inner circumference surface of the cylinder 50. Each of the piston seals 55 is a known seal member (cup seal) which has a cup-shaped section, and which includes a lip portion which is disposed on a radially inner side (not shown in FIG. 1 and so on, (omitted in FIG. 1 and so on)) of the each piston seal 55. In a state where the lip portion is abutted on an outer circumference surface of the piston 54, each of the piston seals 55 is arranged to allow the flow of the brake fluid in one direction, and to suppress a flow of the brake fluid in the other direction. A first piston seal 551 is disposed in a direction toward allow a flow of the brake fluid from the resupply port 502 to the first and second fluid chambers 51P and 51S (the discharge port 501), and to suppress the flow of the brake fluid in the opposite direction. The second piston seal 552 is disposed in a direction to allow the flow of the brake fluid toward the supply port 502, and to suppress the flow of the brake fluid from the resupply port 502. The third piston seal 553 is disposed in a direction to suppress the flow of the brake fluid from the resupply port 504 toward the outside of the cylinder 50. The volumes of the first and second fluid chambers 51P and 51S are decreased when the piston 54 is stroked (moved) in the axial direction opposite to the brake pedal 2 by the depression operation of the brake pedal 2 by the driver, so as to generate the hydraulic pressure (the master cylinder pressure). With this, the brake fluid is supplied from the first and second fluid chambers 51P and 51S through the discharge port 501 toward the wheel cylinder 8. Besides, substantially identical hydraulic pressure is generated in the first and second fluid chambers 51P and 51S in the P system and the S system.

Hereinafter, a brake hydraulic pressure circuit of the hydraulic pressure unit 6 is illustrated with reference to FIG. 1. Affixes a-d are attached to ends of the symbols of members corresponding to the wheels FL-RR. The hydraulic pressure unit 6 includes a first hydraulic passage 11 connecting the discharge port 501 (the first and second fluid chambers 51P and 51S) of the master cylinder 5, and the wheel cylinder 8; a normally-open shutoff valve 21 (which is opened in a deenergized state) which is provided in the first hydraulic passage 11; a normally-open pressure increasing valve (hereinafter, SOL/V·IN) 22 provided in the first hydraulic passage 11 on the wheel cylinder 8's side of the shutoff valve 21 to correspond to the wheels FL-RR (the hydraulic passages 11a-11d); a suction hydraulic passage 12 which connects the suction port 503 of the master cylinder 5 and the suction portion 70 of the pump 7; a discharge hydraulic passage 13 which connects, in the first hydraulic passage 11, a portion between the shutoff valve 21 and the SOL/V·IN 22, and the discharge portion 71 of the pump 7; a check valve (a discharge valve of the pump 7) 130 which is provided in the discharge hydraulic passage 13, and which is arranged to allow only a flow of the brake fluid from the discharge portion 71's side toward the first hydraulic passage 11's side; a normally-open connection valve 23P provided in the discharge hydraulic passage 13P connecting the downstream side of the check valve 130 and the first hydraulic passage 11P of the P system; a normally-closed (which is closed in the deenergized state) connection valve 23 which is provided in the discharge hydraulic passage 13S connecting the downstream side of the check valve 130, and the first hydraulic passage 11S of the S system; a first pressure decreasing hydraulic passage 14 which connects, in the discharge hydraulic passage 13P, the portion between the check valve 130 and the connection valve 23P, and the suction hydraulic passage 12; a normally-closed pressure regulating valve 24 which is a first pressure decreasing valve provided in the first pressure decreasing valve 14; a second pressure decreasing hydraulic passage 15 which connects the suction hydraulic passage 12 and a portion of the first hydraulic passage 11 on the wheel cylinder 8's side of SOL/V·IN 22; a normally-closed pressure decreasing valve 25 which is a second pressure decreasing valve provided in the second pressure decreasing hydraulic passage 15; a master cut valve (hereinafter, MC valve) 20 which is a first shutoff valve provided on the first hydraulic passage 11P of the P system on the master cylinder 5's side of the shutoff valve 21P; a first simulator hydraulic passage 16 which is a branch passage that is bifurcated from a portion of the first hydraulic passage 11P between the MC valve 20 and the shutoff valve 21P, and that is connected to a main chamber R1 of the stroke simulator 27; a stroke simulator valve 26 which is a normally-closed simulator shutoff valve provided in the first simulator hydraulic passage 16; and a second simulator hydraulic passage 17 connecting an auxiliary chamber (back pressure chamber) R2 of the stroke simulator 27 and the suction hydraulic passage 12.

A fluid reservoir 12a is provided within the hydraulic pressure unit 6 at a portion at which the connection pipe 10R from the master cylinder 5 (the suction port 503) is connected to the suction hydraulic passage 12 of the hydraulic pressure unit 6 (on the upper side (portion) of the hydraulic pressure unit 6 in the vertical direction). The discharge hydraulic passages 13P and 13S constitute connection passages connecting the first hydraulic passage 11P of the P system and the first hydraulic passage 11S of the S system. The pump 7 is connected to the wheel cylinders 8a-8d through the connection passages (the discharge hydraulic passages 13P and 13S) and the first hydraulic passages 11P and 11S. The pump 7 is a second hydraulic pressure source arranged to discharge the brake fluid to the connection passages (the discharge hydraulic passages 13P and 13S), and thereby to increase the wheel cylinder hydraulic pressure. At least one of the shutoff valve 21, the SOL/V·IN 22, the connection valve 23P, the pressure regulating valve 24, and the pressure regulating valves 25 in the each system (the pressure decreasing valves 25c and 25d of the rear wheels RL and RR in this embodiment) is a proportional control valve whose a valve opening degree is adjusted in accordance with current supplied to the solenoid. The other valves, that is, the MC valve 20, the connection valve 23S, other (residual) pressure decreasing valves 25 (the pressure decreasing valves 25a and 25b of the rear wheels RL and RR), and the stroke simulator valve 26 are ON/OFF valves which are controlled to be switched be opened and closed in the ON/OFF manner.

Besides, it is possible to use proportional control valve as the other valves.

The MC valve 20 is provided in the first hydraulic passage 11P between the master cylinder 5 and the stroke simulator 26. A bypass hydraulic passage 110 is provided in parallel with the first hydraulic passage 11 to bypass the MC valve 20. A check valve 210 is provided in the bypass hydraulic passage 110. The check valve 210 is arranged to allow only a flow of the brake fluid from the master cylinder 5's side to the wheel cylinder 8's side. The check valve 210 is provided in the MC valve 20. The check valve 210 is one-way valve arranged to only a flow from the master cylinder 5 to the wheel cylinder 8 when the MC valve 20 is closed. The shutoff valves 21 are provided on the first hydraulic passages 11P and 11S between the wheel cylinder 8 and the stroke simulator valve 26. The bypass hydraulic passage 111 is provided in parallel with the first hydraulic passage 11 to bypass the shutoff valve 21. The check valve 211 is provided on the bypass hydraulic passage 111. The check valve 211 is arranged to allow only a flow of the brake fluid from the master cylinder 5's side to the wheel cylinder 8's side. The check valve 211 is provided in the shutoff valve 21. The check valve 211 is one-way valve arranged to allow only a flow in a direction from the master cylinder 5 to the wheel cylinder 8 when the shutoff valve 21 is closed. Moreover, the bypass hydraulic passage 120 is provided in parallel with the first hydraulic passage 11 to bypass the SOL/V·IN 22. A check valve 220 is provided in the bypass hydraulic passage 120. The check valve 220 is arranged to allow only a flow from the wheel cylinder 8's side to the master cylinder 5's side.

A hydraulic pressure sensor 91 is provided in the first simulator hydraulic passage 16 between the stroke simulator valve 26 and the stroke simulator 27. The hydraulic pressure sensor 91 is arranged to sense a hydraulic pressure of this portion (a hydraulic pressure within the stroke simulator 27, the master cylinder pressure when the master cylinder 5 and the stroke simulator 27 are connected). Besides, for improving the reliability, the hydraulic pressure sensor for sensing the master cylinder pressure is provided in the hydraulic passage of the S system (in the first hydraulic passage 11 between the master cylinder 5 and the shutoff valve 21S). A hydraulic pressure sensor 92 is provided in the first hydraulic passage 11 between the shutoff valve 21 and the SOL/V·IN 22. The hydraulic pressure sensor 92 is arranged to sense a hydraulic pressure (the wheel cylinder hydraulic pressure) of the first hydraulic passage 11 between the shutoff valve 21 and the SOL/V·IN 22. A hydraulic pressure sensor 93 is provided in the discharge hydraulic passage 13P between the discharge portion 71 of the pump 7 (the check valve 130) and the connection valve 23P. The hydraulic pressure sensor 93 is arranged to sense the hydraulic pressure (the pump discharge pressure) of the discharge hydraulic passage 13P between the discharge portion 71 of the pump 7 and the connection valve 23P.

The stroke simulator 27 includes a piston 27a which separates (divides) the chamber R into two chambers (the main chamber R1 and the auxiliary chamber R2), and which is arranged to be moved within the chamber R in the axial direction; and a spring 27b which is disposed in the compressed state within the auxiliary chamber R2, and which is an elastic member that is arranged to constantly urge the piston 27a to the main chamber R1's side (in a direction to decrease the volume of the main chamber R1, and to increase the volume of the auxiliary chamber R2). In a state where the shutoff valve 21 is controlled in the opening direction, the brake system (the first hydraulic passage 11) connecting the first and second fluid chambers 51P and 51S of the master cylinder 5 and the wheel cylinder 8 constitutes a first system configured to generate the wheel cylinder hydraulic pressure by the master cylinder pressure generated by the pedal depression force, so as to attain the depression force brake (non-boost control). On the other hand, in a state where the shutoff valve 21 is controlled in the closing direction, the brake system (the suction hydraulic passage 12, the discharge hydraulic passage 13, and so on) which includes the pump 7, and which connects the reservoir 4 and the wheel cylinders 8 constitutes a second system configured to generate the wheel cylinder hydraulic pressure by the hydraulic pressure generated by using the pump 7, to constitute a brake-by-wire system configured to attain the boost control, the regenerative cooperative control, and so on.

In a state where the master cylinder 5 and the wheel cylinder 8 are shut off when the shutoff valve 21 is controlled in the closing direction, the brake fluid flowing out from at least the master cylinder 5 (the first fluid chamber 51P) to the first hydraulic passage 11P flows into the main chamber R1 through the first simulator hydraulic passage 16, and consequently the stroke simulator 27 generates the pedal stroke. When the driver performs the brake operation (depresses or returns the brake pedal 2) in a state where the shutoff valve 21P is closed to shutoff the connection between the master cylinder 5 and the wheel cylinder 8, and the MC valve and the stroke simulator valve 26 are opened to connect the master cylinder 5 and the stroke simulator 27, the stroke simulator 27 sucks or discharge the brake fluid from the master cylinder 5 so as to generate the pedal stroke. In particular, when the hydraulic pressure (the master cylinder pressure) which is equal to or greater than the predetermined pressure is acted to a pressure receiving surface of the piston 27a of the main chamber R1, the piston 27a is moved in the axial direction toward the auxiliary chamber R2 while compressing the spring 27b. The volume of the main chamber R1 is increased. With this, the brake fluid flows into the main chamber R1 from the master cylinder 5 (the discharge port 501P) through the hydraulic passages (the first hydraulic passage 11P and the first simulator hydraulic passage 16). The brake fluid is discharged from the auxiliary chamber R2 through the second simulator hydraulic passage 17 to the suction hydraulic passage 12. When the pressure within the main chamber R1 is decreased to a pressure which is equal to or smaller than the predetermined pressure, the piston 27a is returned to an initial position by the urging force (elastic force) of the spring 27. The stroke simulator 27 sucks the brake fluid from the master cylinder 5 in this way. With this, the stroke simulator 27 imitates the fluid rigidity of the wheel cylinder 8 to attain the pedal depression feeling.

In this embodiment, the stroke simulator 27 is also used as a low pressure accumulator arranged to accumulator (store) the hydraulic pressure of the relatively low pressure, in addition to means configured to generate the pedal stroke. In particular, at the initial stage of the pressure increase of the wheel cylinder hydraulic pressure by the master cylinder 5 or the pump 7, the stroke simulator 27 supplies the brake fluid stored within the stroke simulator 27 to the wheel cylinder 8 (increase the wheel cylinder hydraulic pressure by using the hydraulic pressure stored within the stroke simulator 27). With this, the stroke simulator 27 assist the pressure increase of the wheel cylinder hydraulic pressure by the master cylinder 5 or the pump 5. The stroke simulator 27 serving as the low pressure accumulator stores the hydraulic pressure by which the brake pad of the caliper is moved, to close the predetermined clearance (the buca) between the brake pad and the brake disc at the deactuation of the deactuation of the caliper, for example, substantially, the hydraulic pressure of substantially 0.2 MPa.

The ECU 100 constitutes the hydraulic pressure control section configured to actuate the pump 7, the electromagnetic valve 20 and so on based on the various information, and thereby to control the hydraulic pressures of the wheel cylinders 8. The ECU 100 includes a brake operation amount sensing section 101; a target wheel cylinder hydraulic pressure calculating section 102; a depression force brake generating section 103; a boost control section 104; a boost control switching section 105; an auxiliary pressure increasing section 106; and a brake fluid storing section 107. The brake operation amount sensing section 101 is configured to receive an input of the detection value of the stroke sensor 90, and to sense a displacement amount (the pedal stroke) of the brake pedal 2 which is the brake operation amount. Besides, the stroke sensor 90 is not limited to the sensor arranged to directly sense the displacement amount of the brake pedal 2. The stroke sensor 90 may be a sensor arranged to sense a displacement amount of the push rod 30. Moreover, there may be provided a depression sensor arranged to sense the depression force of the brake pedal 2. The brake operation amount may be sensed based on the detection value of the depression sensor. That is, the brake operation amount used for the control is not limited to the pedal stroke. The other appropriate variables may be used as the brake operation amount for the control.

The target wheel cylinder hydraulic pressure calculating section 102 calculates the target wheel cylinder hydraulic pressure. In particular, the target wheel cylinder hydraulic pressure calculating section 102 calculates the predetermined boost ratio, that is, the target wheel cylinder hydraulic pressure to attain the ideal relationship characteristics between the pedal stroke and the required brake hydraulic pressure (the vehicle deceleration G) of the driver, based on the sensed pedal stroke. In this embodiment, for example, in the brake device which is provided with the engine negative pressure booster of the normal size, and which is not provided with the link mechanism 3, the predetermined relationship characteristics between the pedal stroke and the wheel cylinder hydraulic pressure (the brake hydraulic pressure) which is attained at the operation of the engine negative pressure booster is the ideal relationship characteristics to calculate the target wheel cylinder hydraulic pressure. Besides, at the regenerative cooperative brake control, the target wheel cylinder hydraulic pressure calculating section 102 calculates the target wheel cylinder hydraulic pressure by the relationship with the regenerative braking force. In particular, the target wheel cylinder hydraulic pressure is calculated so that the summation of the regenerative braking force inputted from the control unit of the regenerative braking device and the hydraulic pressure braking force corresponding to the target wheel cylinder hydraulic pressure satisfies the vehicle deceleration which is required by the driver. Besides, at the VDC, the target wheel cylinder hydraulic pressures of the wheels FL-RR are calculated, for example, based on the sensed vehicle motion state amounts (the lateral acceleration and so on), so as to attain the desired vehicle motion state.

The depression force brake generating section 103 controls the shutoff valve 21 in the opening direction. With this, the depression force brake generating section 103 brings the state of the hydraulic pressure unit 6 to a state where the hydraulic pressure unit 6 can generate the wheel cylinder hydraulic pressure by the master cylinder pressure (the first system), so as to attain the depression brake. Moreover, the depression brake generating section 103 controls the stroke simulator 26 in the closing direction. With this, the depression brake generating section 103 shuts off the connection between the master cylinder 5 and the stroke simulator 27. The boost control section 104 controls the shutoff valve 21 in the closing direction. With this, the boost control section 104 brings the state of the hydraulic pressure unit 6 to a state where the hydraulic pressure unit 6 can generate the wheel cylinder hydraulic pressure by the pump 7 (the second system), to perform the boost control. The boost control section 104 controls the actuators of the hydraulic pressure unit 6. With this, the boost control section 104 attains the target wheel cylinder hydraulic pressure. Moreover, the boost control section 104 controls the stroke simulator valve 26 in the opening direction. With this, the boost control section 104 connects the master cylinder 5 and the stroke simulator 27.

The boost control switching section 105 controls the operation of the hydraulic pressure unit 6 based on the calculated target wheel cylinder hydraulic pressure. The boost control switching section 105 switches the depression force brake and the boost control. In particular, when the brake operation amount sensing section 101 senses the start of the brake operation, when the calculated target wheel cylinder hydraulic pressure is equal to or smaller than the predetermined pressure (for example, a value corresponding to the maximum value of the vehicle deceleration G generated at the normal brake which is not the sudden braking), the depression force brake generating section 103 generate the wheel cylinder hydraulic pressure. On the other hand, when the calculated target wheel cylinder hydraulic pressure becomes greater than the predetermined value at the depression of the brake, the boost control section 104 generates the wheel cylinder hydraulic pressure. In this way, at the initial stage of the brake at which the brake operation amount is relatively small, that is, in the predetermined brake operation region (the low pressure region) after the stat of the brake operation, the device 1 generates the wheel cylinder hydraulic pressure by the first system. In the predetermined brake operation region (the high pressure region) in which the brake operation amount is relatively large, the device 1 generates the wheel cylinder hydraulic pressure by the second system, so as to attain the boost function. With this, it is possible to improve the energy efficiency, relative to a brake device in which the boost device is constantly actuated in accordance with the brake operation of the driver.

In the initial stage of the pressure increase of the wheel cylinder hydraulic pressure, the assist pressure increasing section 106 increases the wheel cylinder hydraulic pressure by using the brake fluid which flows in advance into the stroke simulator 27, and which is stored in the stroke simulator 27. The brake fluid storing section 107 stores the brake fluid which is used for the pressure increase of the wheel cylinder hydraulic pressure by the auxiliary pressure increase section 106 is stored in the stroke simulator 27.

Effects of First Embodiment

Figure 2:
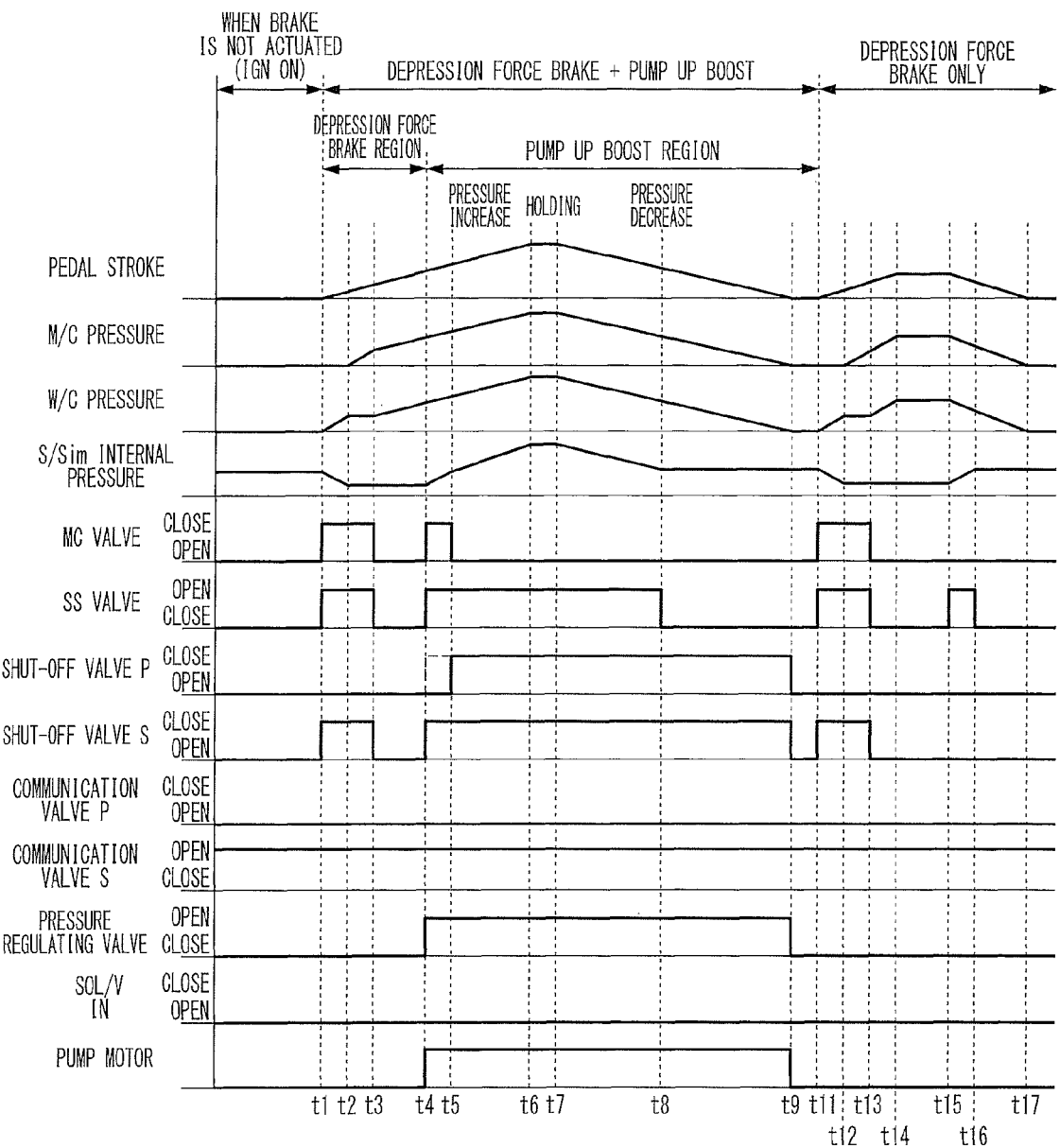
FIG. 2 is a time chart showing a time variation of hydraulic pressures of the brake device according to the first embodiment, and actuation states of the actuator.

Next, operations are illustrated. FIG. 2 is a time chart showing a time variation of the hydraulic pressure and the actuation state of the actuator. A case where the boost control is performed in addition to the depression force brake (time t1-t9), and a case where the only depression force brake is performed (time t11-t17) are continuously shown. FIG. 3 to FIG. 10 exemplify the actuation states of the actuators of the hydraulic pressure unit 6 by using the circuit diagram which is identical to FIG. 1. The flow of the brake fluid is represented by a chain line.

First, the case (time t1 to t9) where the boost control is performed in addition to the depression force brake is illustrated. Before time t1, at the deactuation of the brake, the pedal stroke, the master cylinder pressure, and the wheel cylinder pressure are substantially zero. The actuators are the initial states shown in FIG. 1 by the deenergization. The brake fluid for the auxiliary pressure increase of the wheel cylinder hydraulic pressure is stored within the stroke simulator 27. The predetermined hydraulic pressure (substantially 0.2 MPa). That is, at this time, the stroke simulator 27 serves as the low pressure accumulator arranged to store the hydraulic pressure for auxiliary increasing the pressures of the wheel cylinders 8. The driver depresses the brake pedal 2 at time t1. Thereafter, the pedal stroke is increased. The boost control switching section 105 generates the wheel cylinder hydraulic pressure by the depression force brake generating section 103 until time t4 at which the target wheel cylinder hydraulic pressure calculated based on the pedal stroke becomes greater than the predetermined value.

Figure 3:
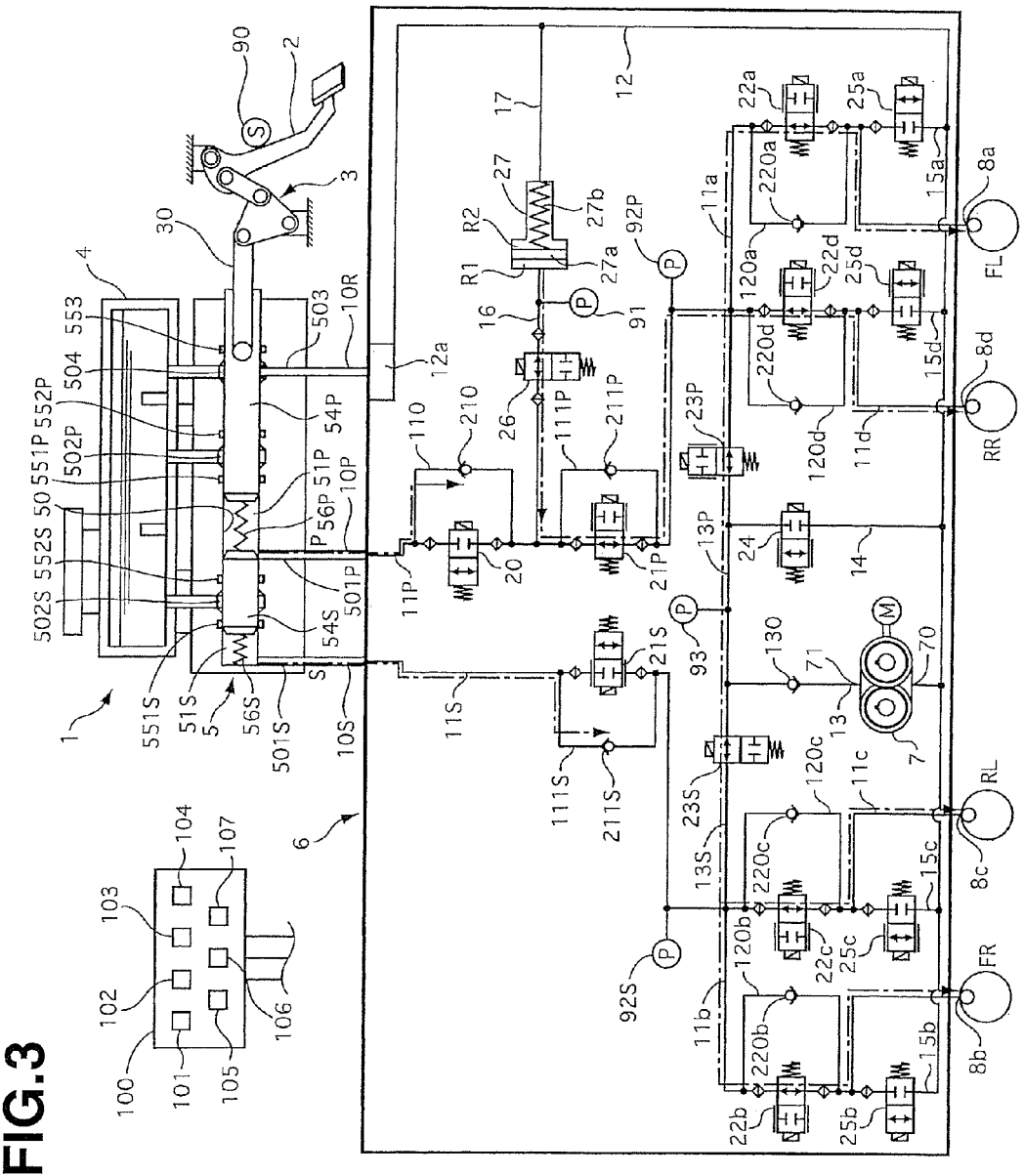
FIG. 3 is a view showing an operation state at an assist pressure increase of the brake device according to the first embodiment.

From time t1 immediately after the depression of the pedal to time t3, at the initial stage of the pressure increase of the wheel cylinder hydraulic pressure, the auxiliary pressure increase section 106 increases the wheel cylinder hydraulic pressure by using the brake fluid stored in the stroke simulator 27. That is, as shown in FIG. 3, when it is sensed that the depression operation amount (the pedal stroke) of the brake pedal 2 becomes greater than zero, the auxiliary pressure increase section 106 is configured to bring the pump 7 to the deactuation state, to control the MC valve in the closing direction, to control the stroke simulator valve 26 in the opening direction, to control the shutoff valve 21P in the opening direction, to control the shutoff valve 21S in the closing direction, to control the SOL/V·IN 22 in the opening direction, to control the connection valve 23 in the opening direction, to control the pressure regulating valve 24 in the closing direction, and to control the pressure decreasing valve 23 in the opening direction. With this, the brake fluid stored within the stroke simulator 27 is supplied through the simulator hydraulic passage 16 and the first hydraulic passage 11P to the wheel cylinder 8a and 8d, and moreover supplied from the first hydraulic passage 11P through the discharge hydraulic passage 13 and the first hydraulic passage 11S to the wheel cylinders 8b and 8c. Besides, the fluid amount stored in the stroke simulator 27 can be estimated from the detection value of the hydraulic pressure sensor 91 and the design value of the stroke simulator 27. The wheel cylinder hydraulic pressure which is increased by the supply of the brake fluid from the stroke simulator 27 can be also estimated to some degree.

By controlling the MC valve 20 provided in the first hydraulic passage 11P between the connection portion of the first simulator hydraulic passage 16, and the master cylinder 5, the hydraulic passage (for the auxiliary pressure increase) connecting the stroke simulator 27 and the wheel cylinder 8 is shut off from the master cylinder 5. With this, it is possible to surely perform the supply of the brake fluid from the stroke simulator 27 to the wheel cylinder 8, and to smooth the auxiliary pressure increase. Moreover, by controlling the shutoff valve 21S in the closing direction, the flow of the brake fluid supplied from the stroke simulator 27 through the first hydraulic passage 11P and the discharge hydraulic passage 13 into the first hydraulic passage 11S, toward the master cylinder 5's side (the second fluid chamber 51S) is suppressed. With this, it is possible to more surely perform the auxiliary pressure increase.

From time t1 to time t2, the hydraulic pressure of the wheel cylinder 8 is increased by the supply of the brake fluid from the stroke simulator 27. Moreover, the hydraulic pressure within the stroke simulator 27 is decreased. A time period from time t1 to time t2 is a time period suddenly after the depression of the brake pedal 2. Accordingly, it is suggested that the master cylinder pressure is substantially zero (the atmospheric pressure). That is, basically, the auxiliary pressure increase is finished while the piston 54P and 54S of the master cylinder 5 is connected with each other (while the flow of the brake fluid from the first and second fluid chambers 51P and 51S to the resupply port 502 is not suppressed by the first piston seal 55). On the other hand, when the master cylinder pressure is generated by the sudden depression and so on of the brake pedal 2 before the transition to the boost control, and the master cylinder pressure becomes greater than the hydraulic pressure within the stroke simulator 27 (the hydraulic pressure of a portion of the first hydraulic passage 11P on the wheel cylinder 8's side of the MC valve 20), the brake fluid from the master cylinder 5 passes through the check valve 210 of the bypass hydraulic passage 110 in the primary system, and passes through the check valve 211S of the bypass hydraulic passage 110S in the secondary system. Accordingly, the pistons 54P and 54S of the master cylinder 5 can be moved (the increase of the pedal stroke). With this, the stiff depression feeling (an iron plate brake) is suppressed. With this, it is possible to suppress the feeling of the brake operation (the pedal feeling).

At time t2, the hydraulic pressure within the stroke simulator 27 and the wheel cylinder hydraulic pressure become the substantially identical pressure. Moreover, the master cylinder pressure is started to be increased from substantially zero. When the master cylinder pressure becomes greater than the hydraulic pressure within the stroke simulator 27 or the wheel cylinder hydraulic pressure, the brake fluid flows from the master cylinder 5's side through the check valves 201 and 211S to the wheel cylinder 8's side.

Figure 4:
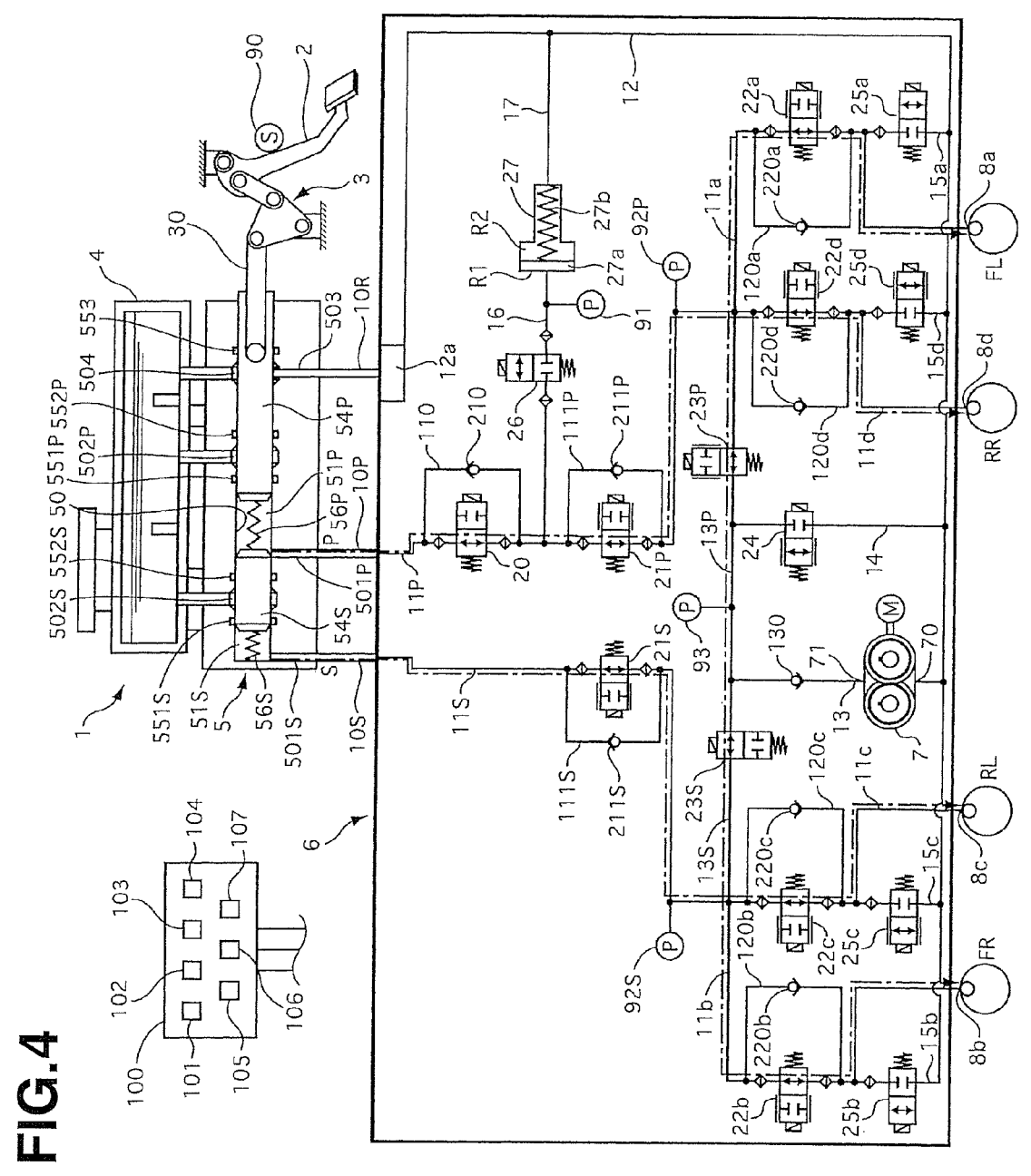

At time t3, when it is judged that the master cylinder pressure becomes greater than the wheel cylinder hydraulic pressure, the depression force brake generating section 103 finishes the control of the auxiliary pressure increasing section 106, controls the stroke simulator valve 26 in the closing direction, controls the MC valve 20 and the shutoff valve 21S in the opening direction, and switched to the depression force brake. That the master cylinder pressure becomes greater than the wheel cylinder hydraulic pressure can be sensed, for example, by after the detection values of the hydraulic pressure sensors 91 and 92 (after the hydraulic pressure within the stroke simulator 27 and the wheel cylinder hydraulic pressure become eh substantially identical pressure, the detection value of the hydraulic pressure sensor 91 (the hydraulic pressure within the stroke simulator 27) is started to be increased, or the pedal stroke becomes equal to or greater than a constant value. In this way, there is provided the check valves 210 and 211S arranged to allow the flow of the brake fluid from the master cylinder 5's side to the wheel cylinder 8's side. When the master cylinder pressure becomes substantially identical to the wheel cylinder hydraulic pressure, it is switched from the auxiliary pressure increase to the depression force brake. With this, it is possible to smoothly perform this transition (without unnatural feeling of the pedal feeling). After time t3, the depression force generating section 103 attains the depression force brake. As shown in FIG. 4, the connection valve 23S is controlled in the opening direction, and the other actuators (the pump 7 and the other electromagnetic valves) are brought to the deactuation states. With this, the brake fluid is supplied from the master cylinder 5 through the first hydraulic passages 11P and 11S to the wheel cylinders 8a-8d. besides, the brake operation force is amplified by the link mechanism 3.

That is, from time t1-t2, the auxiliary pressure increase section 106 increases the hydraulic pressures of eh wheel cylinders 8 through the hydraulic passage 11P of eh primary system and the connection passages (the discharge hydraulic passage 13P and 13S) by the pressure of the stroke simulator 27. Then, from time t3, the depression force brake generating section 103 controls the stroke simulator valve 26 in the closing direction, controls the shutoff valve 21S in the opening direction, and increases the hydraulic pressures of the wheel cylinders 8 through the hydraulic passage 11S of the secondary system and the connection passages (the discharge hydraulic passage 13P and 13S) by the pressure of the second hydraulic chamber 51S of the master cylinder 5. Moreover, the depression brake generating section 103 increases the hydraulic pressures of the wheel cylinders 8 through the hydraulic passage 11P of the primary system and the connection passages (the discharge hydraulic passages 13P and 13S) by the pressure of the first fluid chamber 51P of the master cylinder 5.

From time t3 to time t4, the master cylinder pressure and the wheel cylinder hydraulic pressure are increased in accordance with the increase of the pedal stroke. On the other hand, the hydraulic pressure within the stroke simulator 27 is held to the value at the time t3. At time t4, the target wheel cylinder hydraulic pressure calculated based on the pedal stroke becomes greater than the predetermined value. Accordingly, the boost control switching section 105 generates the wheel cylinder hydraulic pressure by the boost control section 104, not by the depression force brake generating section 103. Basically, the control operation is switched to the following control state by the boost control section 104.

Figure 5:
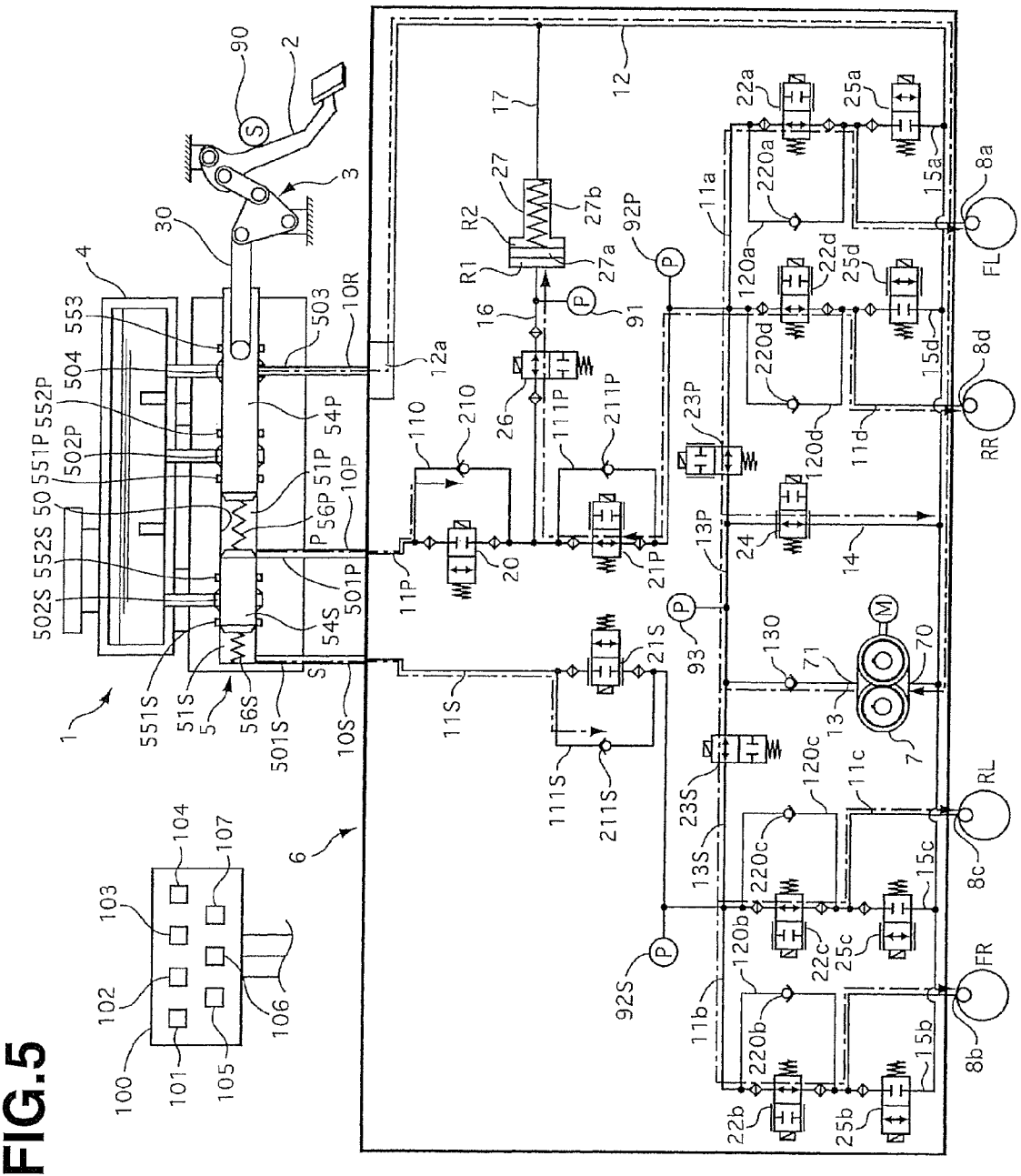
FIG. 5 is a view showing an operation state at the switching from the depression force brake to the boost control in the brake device according to the first embodiment.

On the other hand, when it is switched from the depression force brake to the boost control at time t4, as shown in FIG. 5, the boost control switching section 105 controls the MC valve 20 in the closing direction, and controls the valve opening state of the shutoff valve 21P. With this, the boost control switching section 105 adjusts the hydraulic pressure within the stroke simulator 27. That is, when it is switched from the depression force brake to the boost control, a pressure difference between the hydraulic pressure within the stroke simulator 27 held after the auxiliary pressure increase, and the master cylinder pressure (and the wheel cylinder hydraulic pressure which are) increased by the brake depression operation after the auxiliary pressure increase and the wheel cylinder hydraulic pressure is generated. In this state, it is switched to the boost control. Accordingly, when the shutoff valve 21P is controlled in the closing direction and the MC valve 20 is controlled in the opening direction, the brake pedal 2 may be suddenly stroked (moved) by the pressure difference between the master cylinder pressure (the wheel cylinder hydraulic pressure) and the hydraulic pressure within the stroke simulator 27, so that the sudden variation of the pedal stroke may be generated. Accordingly, in this embodiment, before it is completely switched from the depression brake to the boost control, the MC valve 20 is controlled in the closing direction, and the valve opening state of the shutoff valve 21P is controlled. That is, the MC valve 20 (not the shutoff valve 21P) is shut off. The brake fluid is transmitted from the pump 7 to the stroke simulator 27 (not only the wheel cylinders 8). With this, the hydraulic pressure within the stroke simulator 27 is adjusted. Consequently, it is possible to suppress the sudden variation of the pedal stroke, and to suppress the deterioration of the pedal feeling.

In particular, until the relationship characteristics between the pedal stroke at the complete switching to the boost control (when the MC valve 20 is controlled in the opening direction), and the pedal depression force becomes an appropriate relationship, or until it is sensed that the difference between the hydraulic pressure within the stroke simulator 27 and the wheel cylinder hydraulic pressure (the master cylinder pressure) becomes sufficiently small, based on the detection values of the hydraulic pressure sensors 91 and 92, the MC valve 20 is controlled in the closing direction, and the valve opening state of the shutoff valve 21P is controlled. Beside, in this case, the brake fluid from the pump 7 is leaked at the shutoff valve 21P in addition to at the pressure regulating valve 24. This is for suppressing the sudden variation of the pedal stroke as described above. The pressure regulation of the wheel cylinder hydraulic pressure to the target hydraulic pressure is continued. That is, the shutoff valve 21P (and the stroke simulator 27) temporarily performs the pressure regulating function of the wheel cylinder to the target hydraulic pressure. With this, it is possible to suppress the sudden variation of the pedal stroke. At time t5, when the hydraulic pressure within the stroke simulator 27 is adjusted so that, for example, the difference with the wheel cylinder hydraulic pressure (the master cylinder pressure) becomes sufficiently small, the control operation is switched to the following control state.

Figure 6:
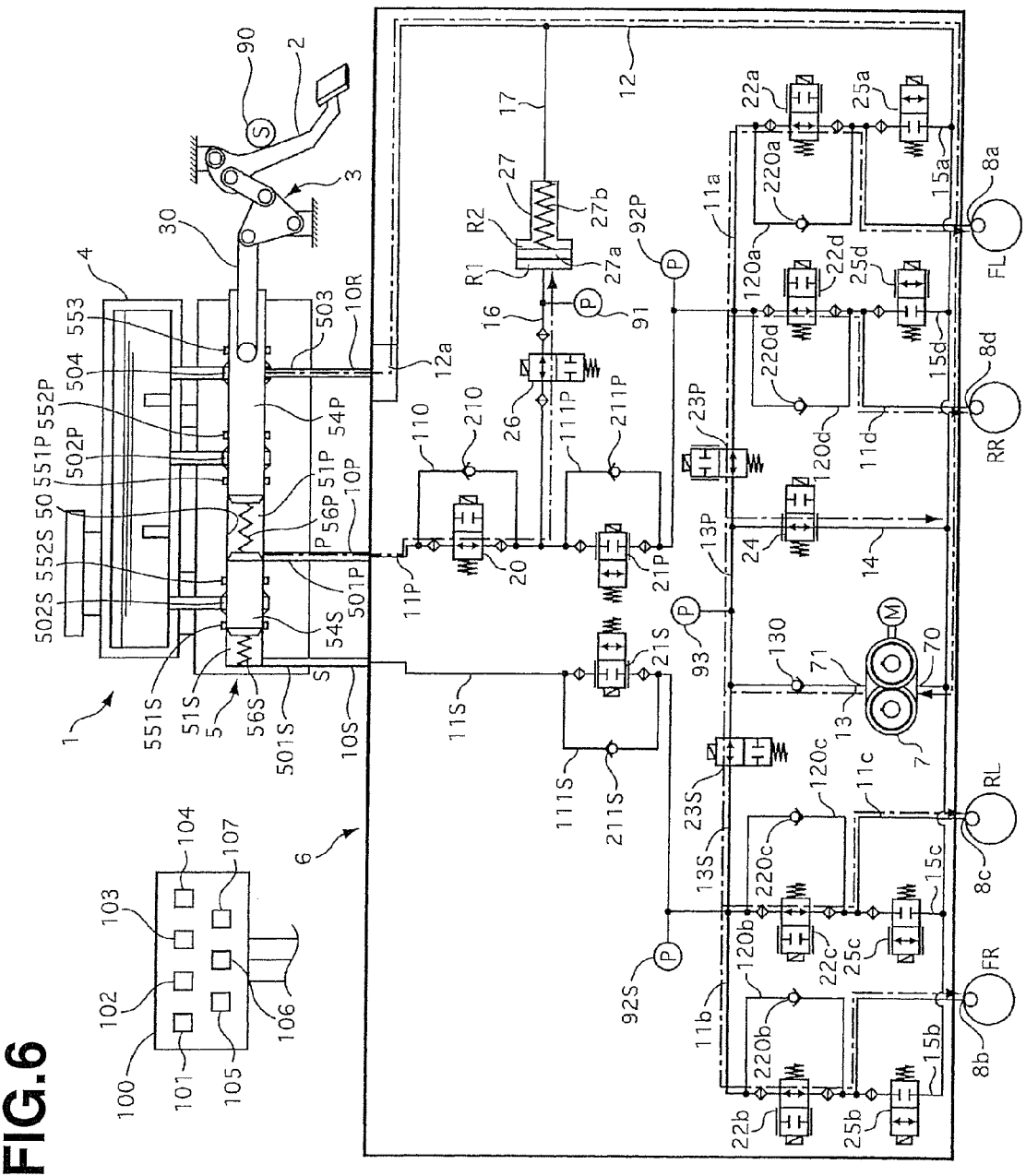
FIG. 6 is a view showing an actuation state at the boost control (the pressure increase) of the brake device according to the first embodiment.
Figure 7:
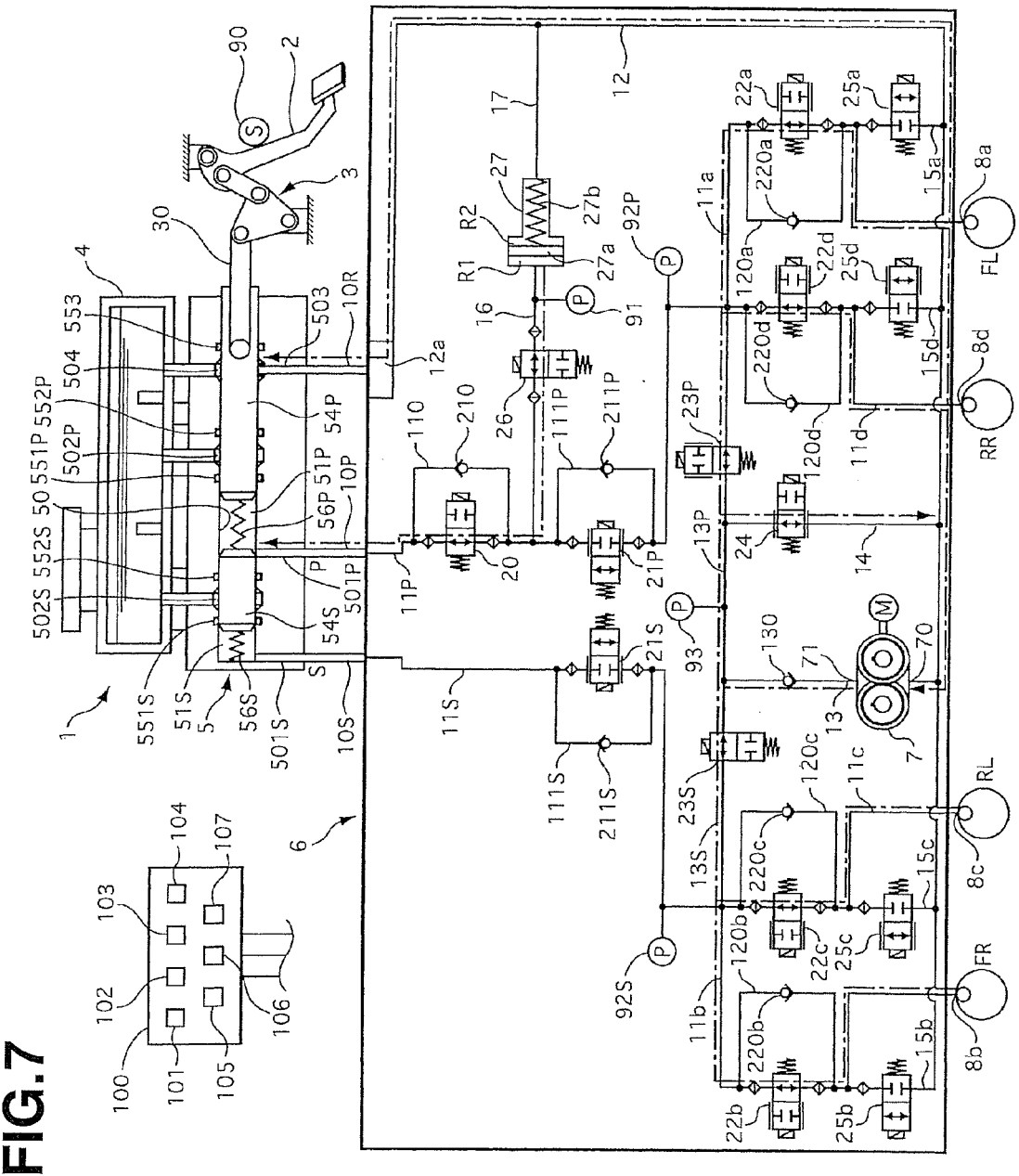
FIG. 7 is a view showing an actuation state at the boost control (the pressure decrease) of the brake device according to the first embodiment.

As shown in FIG. 6 and FIG. 7, the boost control section 104 drives the pump 7, controls the MC valve 20 in the valve opening direction, controls the stroke simulator valve 26 in the valve opening direction, controls the shutoff valve 21 in the valve closing direction, controls the SOL/V·IN 22 in the valve opening direction, controls the connection valve 23 in the valve opening direction, controls the pressure regulating valve 24 in the valve opening direction, and controls the pressure decreasing valve 25 in the valve closing direction. The valve opening state of the pressure regulating valve 24 is controlled based on the detection values of the hydraulic pressure sensors 92 and 93. With this, the control operation is performed so that the wheel cylinder hydraulic pressure becomes the target hydraulic pressure. The shutoff valve 21 is controlled in the closing direction to shut off between the master cylinder 5's side and the wheel cylinder 8's side. With this, it is possible to readily control the wheel cylinder hydraulic pressure independently of the pedal operation of the driver.

In this embodiment, basically, the wheel cylinder hydraulic pressure is controlled by controlling the pressure regulating valve 24, not the pump 7. The pressure regulating valve 24 is the proportional control valve. Accordingly, it is possible to perform the fine control. Consequently, it is possible to attain the smooth control of the wheel cylinder hydraulic pressure.

Besides, the control operation is not limited to this. It is optional to control, for example, the rotation speed (the discharge amount) of the pump 7. It is optional to control the wheel cylinder hydraulic pressure by controlling the pressure decrease valve 25, in place of the pressure regulating valve 24 (or with the pressure regulating valve 24). Moreover, it is optional to stop the pump 7 at the holding and the pressure decrease of the wheel cylinder hydraulic pressure. By the valve opening of the stroke simulator valve 26, the brake fluid flowing out from the master cylinder 5 flows into the stroke simulator 27 by the depression operation of the driver (cf. FIG. 6). With this, even when the wheel cylinder hydraulic pressure is controlled independently of the pedal operation of the driver, it is possible to do the pedal stroke, to imitate the operation feeling of the brake pedal 2, and to improve the feeling at the pedal depression operation.

Besides, by the pedal depression return operation of the driver, the brake fluid is returned from the stroke simulator 27 to the master cylinder 5 (cf. FIG. 7). During this boost control, in a state where the stroke simulator 26 is opened, the detection value of the hydraulic pressure sensor 91 can be considered as a substantially identical master cylinder pressure. Accordingly, the hydraulic pressure sensor 91 serves as the master cylinder pressure sensor arranged to sense the master cylinder pressure.

From time t4 to time t6, the driver depresses the brake pedal 2, to increase the pedal stroke. As shown in FIG. 6, the boost control section 104 controls the valve opening state of the pressure regulating valve 24 to attain the target wheel cylinder hydraulic pressure calculated based on the increasing pedal stroke. With this, the wheel cylinder hydraulic pressure is controlled to be increased. From time t6 to time t7, the driver holds the depression amount (the pedal stroke) of the brake pedal 2. The boost control section 104 controls the valve opening state of the pressure regulating valve 24 so as to attain the target wheel cylinder hydraulic pressure calculated based on this pedal stroke. With this, the boost control section 104 control to hold the wheel cylinder hydraulic pressure. From time t7 to time t9, the driver returns the depression of the brake pedal 2. The boost control section 104 controls the opening state of the pressure regulating valve 24 to attain the target wheel cylinder hydraulic pressure calculated based on this pedal stroke. With this, the wheel cylinder hydraulic pressure is controlled to be decreased. During this time period, from time t5 to time t8, the hydraulic pressure within the stroke simulator 27 is increased or decreased in accordance with the increase or the decease of the master cylinder pressure.

Figure 8:
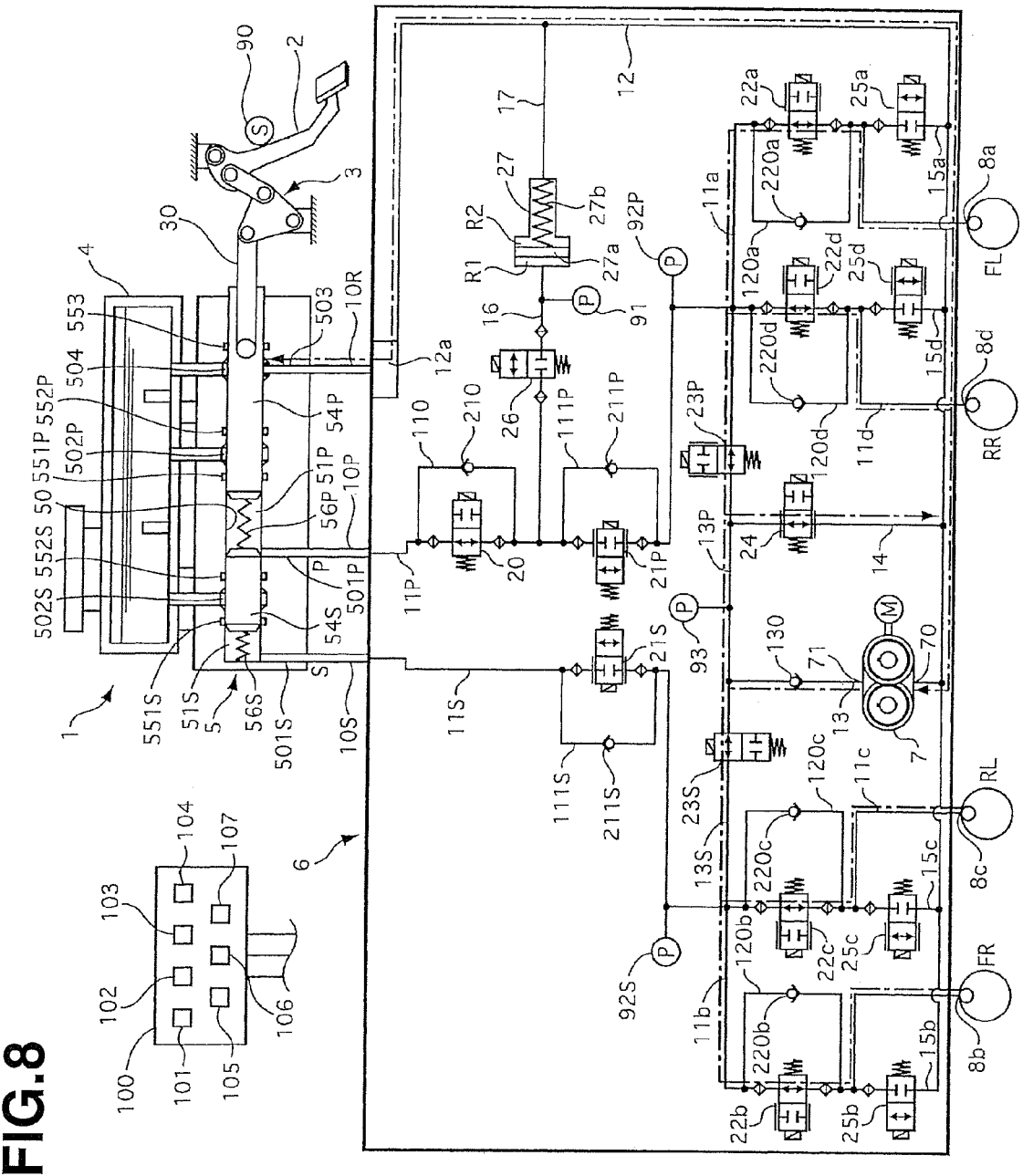
FIG. 8 is a view showing an actuation state at the pressure accumulation (during the boost control) of the brake device according to the first embodiment.

After time t8, that is, when the pedal depression return operation is finished, the stroke simulator 27 is used as the low pressure accumulator for the auxiliary pressure increase immediately after the next pedal depression. The brake fluid storing section 107 stores the pressure to the stroke simulator 27. When the pedal stroke becomes small (the brake pedal is returned) and the brake operation is finished, when the brake fluid storing section 107 senses that the hydraulic pressure within the stroke simulator 27 (the master cylinder pressure) is equal to or smaller than the predetermined pressure (the target pressure stored within the stroke simulator 27), based on the detection values of the hydraulic pressure sensors 91, as shown in FIG. 8, the brake fluid storing section 107 controls the stroke simulator valve 26 in the closing direction. With this, after time t8, the brake fluid is shut in the stroke simulator 27, the hydraulic pressure of the predetermined pressure is stored (accumulated). In this case, the first simulator hydraulic passage 16 connecting the stroke simulator 27 and the first hydraulic passage 11P serves as the pressure storing hydraulic passage for storing the hydraulic pressure within the stroke simulator 27. The stroke simulator valve 26 provided in the first simulator hydraulic passage 16 is actuated in the valve closing direction. With this, the stroke simulator valve 26 serves as the accumulator valve arranged to further surely hold the hydraulic pressure stored within the stroke simulator 27. The brake fluid within this stroke simulator 27 is the brake fluid flowing by the brake operation of the driver. Accordingly, the specific hydraulic pressure source arranged to flow the brake fluid into the stroke simulator 27 for storing the pressure is not needed.

Figure 9:
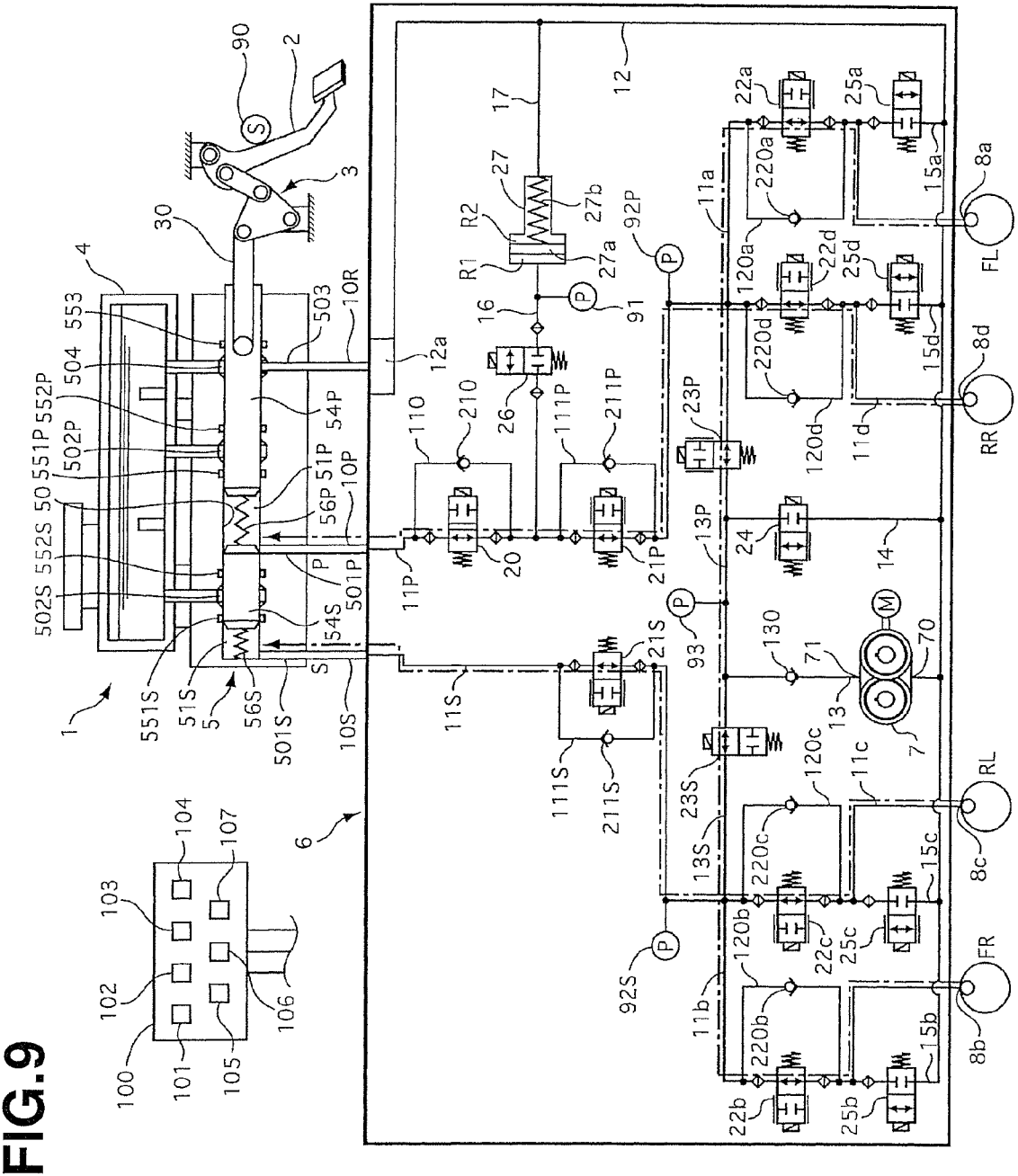
FIG. 9 is a view showing an actuation state at the pressure accumulation in the brake device according to another embodiment.

In this embodiment, during the above-described pressure storage, the pressure regulating valve 24 is controlled in the opening direction to continue the pressure decrease of the wheel cylinder hydraulic pressure through the suction hydraulic passage 12. Besides, by controlling the stroke simulator valve 26 and the shutoff valve 21 in the closing direction, the brake fluid may become hard to be returned to the master cylinder 5. However, at the pedal depression return operation, if the variation of the relationship characteristic of the pedal depression force and the pedal stroke provides little effect to the pedal feeling, there is no problem. Moreover, as shown in FIG. 9, during the pressure storage, the shutoff valve may be controlled in the opening direction. In this case, the brake fluid of the wheel cylinders 8 is returned through the first hydraulic passage 11 to the master cylinder 5's side. With this, the brake pedal 2 is easy to be returned. In this case, when the shutoff valve 21 is controlled in the opening direction, the pedal feeling may be varied due to the pressure difference between the wheel cylinder hydraulic pressure and the master cylinder pressure. However, in the boost control, the pressure difference between the wheel cylinder hydraulic pressure and the master cylinder pressure is small, relative to the regenerative cooperative brake control. The variation of the relational characteristics between the pedal depression force and the pedal stroke provides relatively small effect to the pedal feeling, at the pedal depression return operation. Accordingly, even when the shutoff valve 21 is controlled in the opening direction, the pedal feeling may not be deteriorated.

In this embodiment, the stroke simulator valve 26 is closed at the pressure storage of the stroke simulator 27. Accordingly, it is possible to sense the open failure of the stroke simulator valve 26. That is, at the normal brake control (at the boost control and so on), the stroke simulator valve 26 is used to be opened. Accordingly, if the stroke simulator valve 26 becomes the open failure, the brake characteristics is not influenced. In a case where the (opening failure) is tried to be sensed, it is necessary to close the stroke simulator valve 26 at the brake. The feeling of the brake operation may be influenced. In this embodiment, when the pedal depression return operation is finished, the stroke simulator valve 26 is closed to store the pressure in the stroke simulator 27. Accordingly, it is possible to sense the open failure of the stroke simulator valve 26 based on the detection value of the hydraulic pressure sensor 91, while suppressing the deterioration of the pedal feeling as described above.

At time t9, the pedal stroke becomes substantially zero. The boost control is finished. With this, the state is returned to the state identical to the state before the time t1.

Next, a case where the only depression force brake is performed (time t11-t17) is illustrated. During the brake depression operation of time t11-t14, the target wheel cylinder hydraulic pressure calculated based on the pedal stroke is equal to or smaller than the predetermined value. The boost control switching section 105 generates the wheel cylinder hydraulic pressure by the depression force brake generating section 103. The operation from time t11 to time 14 is identical to the operation from time t1 to time t4. From time 14 to time t15, the driver holds the pedal stroke. The master cylinder pressure, the wheel cylinder hydraulic pressure, and the hydraulic pressure within the stroke simulator 27 are held in accordance with the pedal stroke. From time t15 to time t17, the driver returns the depression of the brake pedal 2. The master cylinder pressure and the wheel cylinder hydraulic pressure are decreased in accordance with the decrease of the pedal stroke.

Figure 10:
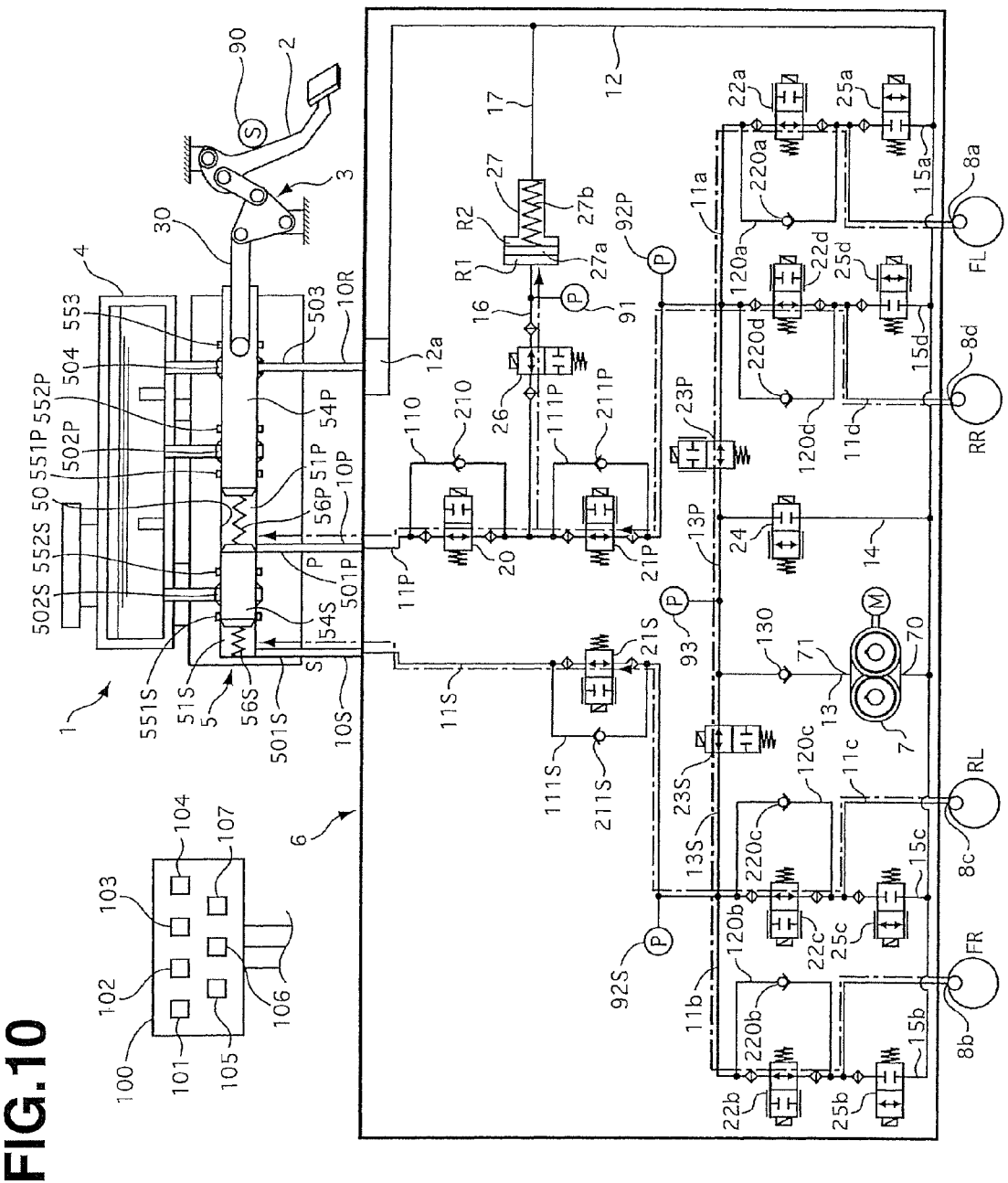
FIG. 10 is a view showing an actuation state at the pressure accumulation (during the depression force brake) of the brake device according to the first embodiment.

After time t15, that is, when the driver returns the depression of the brake pedal 2 and the brake operation is finished, the stroke simulator 27 is used as the low pressure accumulator for the auxiliary pressure increase immediately after the next pedal depression. The brake fluid storing section 107 stores the pressure in the stroke simulator 27. The brake fluid storing section 107 controls the stroke simulator valve 26 in the opening direction as shown in FIG. 10, when sensing the depression return of the brake pedal 2 based on the detection value of the pedal stroke sensor 90. With this, the brake fluid flowing out from the wheel cylinder 8 flows into and is stored in the stroke simulator 27, in addition to the master cylinder 5. The brake fluid storing section 107 controls the stroke simulator valve 26 in the closing direction when the brake fluid storing section 107 senses at time t16 that the hydraulic pressure within the stroke simulator 27 becomes equal to or greater than the predetermined pressure (the target pressure stored (accumulated) in the stroke simulator 27), based on the detection value of the hydraulic pressure sensor 91. Besides, in a case where the detection value of the hydraulic pressure sensor 91 (the hydraulic pressure within the stroke simulator 27) is considered as the value identical to the master cylinder pressure and it is sensed that this detection value (the master cylinder pressure) becomes equal to or smaller than the predetermined pressure, the stroke simulator 26 may be controlled in the closing direction. With this, after time t16, the brake fluid is closed within the stroke simulator 27. The hydraulic pressure having the predetermined pressure is stored (accumulated).

In this way, the brake fluid can be stored in the stroke simulator 27 by the simple operation of the opening and closing of the stroke simulator valve 26. Moreover, when the depression of brake pedal 2 is returned and the master cylinder pressure (the hydraulic pressure within the stroke simulator 27) sensed by the hydraulic pressure sensor 91 becomes the predetermined pressure, by controlling the stroke simulator valve 26 in the closing direction, it is possible to readily store the pressure within the stroke simulator 27. This brake fluid within the stroke simulator 27 is the brake fluid which flows out from the wheel cylinders 8 when the brake operation of the driver is finished, and flows into the stroke simulator 27. Accordingly, the hydraulic pressure source arranged to flows the brake fluid into the stroke simulator 27 by the pressure storage (accumulation) is not needed. Besides, when the stroke simulator valve 26 is controlled in the opening direction, simultaneously, the MC valve 20 may be controlled in the closing direction. With this, it is possible to rapidly flow the brake fluid from the wheel cylinders 8, into the stroke simulator 27.

At the brake immediately after the hydraulic pressure stored in the stroke simulator 27 by the brake fluid storing section 107 is equal to or smaller than the target pressure by hardly depressing the brake pedal 2 (the brake fluid amount supplied to the wheel cylinders 8 is small), the auxiliary pressure increase by the stroke simulator 27 may be insufficient. Accordingly, the correction such as that the timing at which the motor M is rotated is earlier is added. With this, the auxiliary pressure increase by the stroke simulator 27 is complemented to improve the response of the pressure increase of the wheel cylinder 8. Moreover, the stroke simulator 27 is connected to the first hydraulic passage 11P. It is also possible to store the pressure (within the stroke simulator 27) by the pump 7. Accordingly, when the hydraulic pressure stored within the stroke simulator 27 is equal to or smaller than the target pressure, the target pressure is accumulated to the stroke simulator 27 by driving the pump 7, if there is no problem as to the durability. IN this case, another hydraulic pressure source (other than the pump 7) for flowing the brake fluid into the stroke simulator 27 is not needed.

Effects of First Embodiment

The device 1 is not provided with the engine negative booster. The device 1 is arranged to compensate for the insufficient amount of the brake operation force by another energy source (the hydraulic pressure unit 6) which is not the engine negative pressure booster. Accordingly, the device 1 is easy to be applied to the electric vehicle. Moreover, when the device 1 is applied to the vehicle provided with the engine, it is possible to improve the fuel consumption. Moreover, the hydraulic pressure unit for the ABS and the VDC is already provided to the many brake device. The device 1 uses the hydraulic pressure unit 6 as the energy source arranged to compensate for the insufficient amount of the brake operation force, in place of the engine negative pressure booster. Accordingly, it is possible to decrease the number of the components, and to decrease the cost. Moreover, it is possible to simplify the structure of the device, and to improve the mountability to the vehicle. Furthermore, it is possible to decrease the size and weight of the vehicle, and thereby to improve the energy efficiency of the vehicle.

In consideration of the time necessary that the wheel cylinder hydraulic pressure is increased to the predetermined hydraulic pressure in accordance with the brake operation of the driver, that is, in consideration of the pressure increase response, in the brake device provided with the engine negative pressure booster, it is possible to ensure the pressure increase response. However, the size of the device may be increased, and the weight may be increased as described above.

On the other hand, as the brake device which is not provided with the engine negative pressure booster, first, the high pressure accumulator is provided, it is conceivable that the wheel cylinder hydraulic pressure is increased by using the (only) high pressure previously stored in this high pressure accumulator.

However, in this device, the pressure increase response may be ensured to the some extent. However, there is problem to ensure the guarantee of the durability and the reliability of the high pressure accumulator. Moreover, the size of the device may be increased, and the weight of the device may be increased. Second, it is conceivable that the pump having the large displacement (having the large discharge amount) is provided, the wheel cylinder hydraulic pressure is increased by driving the pump by the high pressure motor at the each brake operation (the master cylinder and the pump/motor are the integral member, or the these may be different members).

However, in this device, when the pressure increase response necessary for the sudden braking (for example, the wheel cylinder hydraulic pressure is increased from 0 Mpa to 8 MPa, for example, within 250 msec), the specification of the pump and the motor is apart from the normal state. The size of the device, and the weight of the device may be increased (it becomes the over-spec in the normally-used region). On the other hand, the pressure increase response becomes insufficient when suppressing the size increase of the pump and the motor.

On the other hand, in the device 1 of this embodiment, there is provided the auxiliary pressure increase section (the assist pressure increase section 106 and the stroke simulator 27) arranged to assist the pressure increase of the wheel cylinder hydraulic pressure by the master cylinder 5 or the pump 7. Accordingly, when the device 1 is not provided with the engine negative pressure booster, by assisting the pressure increase of the wheel cylinder hydraulic pressure by the master cylinder 5 or the pump 7, it is possible to improve the pressure increase response of the wheel cylinder hydraulic pressure (the response at the braking). Moreover, the high output (large flow amount (large flow rate)) is not needed to the hydraulic pressure source for the assist pressure increase.

It is not necessary that the high pressure accumulator is used, and that the sizes of the pump 7 and the motor M are increased. Accordingly, it is possible to suppress the size increase of the device 1 and the weight increase of the device 1.

It is conceivable that the small pump and so on is used as the hydraulic pressure source for the assist pressure increase. However, in this case, it is necessary that the hydraulic pressure source is driven at each timing that the pressure increase of the wheel cylinder hydraulic pressure is increased. On the other hand, in the embodiment, the accumulator for storing the hydraulic pressure (stroke simulator 27) is used as the hydraulic pressure source for the assist pressure increase. In this way, the hydraulic pressure is previously accumulated, and the wheel cylinder hydraulic pressure is increased by using the accumulated (stored) hydraulic pressure. It is not necessary that the hydraulic pressure source is not driven at each timing that the pressure increase of the wheel cylinder hydraulic pressure is assisted. Moreover, in this embodiment, the stroke simulator 27 which is arranged to be actuated in accordance with the brake operation of the driver, and to imitate the operation feeling of the brake pedal 2 (imitate (re-create) the pedal depression feeling) is used as the accumulator for the assist pressure increase. Accordingly, it is possible to suppress the increase of the number of the components, and to suppress the size increase and the weight increase of the device 1.

Figure 11:
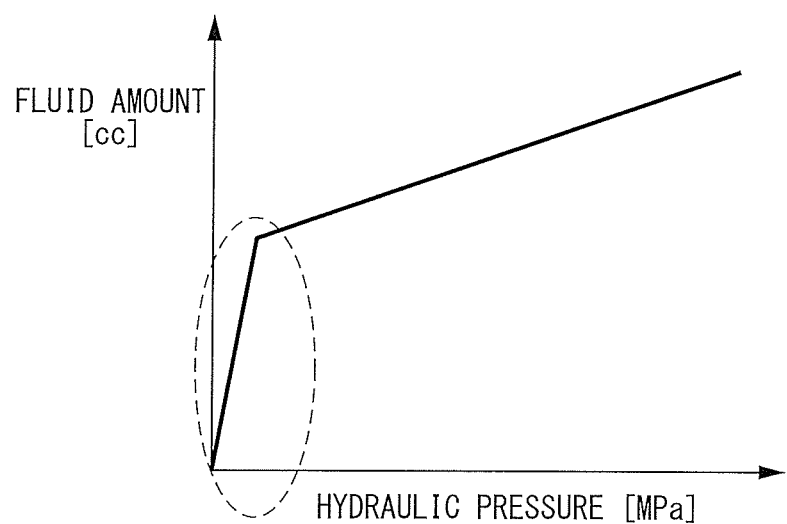
FIG. 11 is a view showing a relation characteristic between the hydraulic pressure and the fluid amount of the wheel cylinder.

Moreover, as a method of improving the pressure increase response, the consumption fluid amount of the wheel cylinder 8 is decreased without increasing the brake fluid amount transmitted to the wheel cylinder 8 (by the high pressure accumulator, the pump having the large displacement and so on). With this, in a case where the device 1 is not provided with the engine negative booster, it is possible to dissolve the insufficient of the pressure increase response without using the high pressure accumulator, or without increasing the discharge amount of the pump 7 and the output of the motor M. Accordingly, it is possible to suppress the size increase of the device 1, and the weight increase of the device 1 while ensuring the response at the brake. In particular, the buka of the caliper is closed (the predetermined clearance is closed by moving the brake pad) for decreasing the consumption fluid amount of the wheel cylinder 8. That is, between the brake pad of the wheel and the brake disk, there is provided the predetermined gap (buka) for suppressing the energy loss and so on by the dragging between the brake pad of the wheel and the brake disk. In particular, in the electric vehicle arranged to perform the regenerative brake, this buka is relatively large for suppressing the deterioration of the fuel consumption by the friction by the dragging. In the relationship between the fluid amount and the hydraulic pressure of the wheel cylinder, the fluid amount consumption is large in the region from the start of the supply of the brake fluid to the wheel cylinder, to a timing at which the braking force is really generated by closing the buka. As shown in the relation characteristic between the fluid amount and the hydraulic pressure of the wheel cylinder in FIG. 11, a portion surrounded by a broken line is a low pressure region in which the buca is closed. In this low pressure region, the gradient by which the hydraulic pressure is increased with respect to the increase of the fluid amount is small. That is, the fluid amount consumed for generating the hydraulic pressure is relatively large. The hydraulic pressure is hardly increased even when the same fluid amount is supplied. In this way, in the low pressure region in which the fluid amount consumption is large, if the buca can be rapidly closed, it is possible to improve the response of the pressure increase of the wheel cylinder hydraulic pressure. Besides, the present embodiment is illustrated in the disc type brake. However, it is identical in the drum type brake.

Accordingly, in this embodiment, the pressure increase (the assist pressure increase) of the wheel cylinder hydraulic pressure for previously closing the buca before the wheel cylinder hydraulic pressure is increased by eh supply of the brake fluid from the master cylinder 5 (or the pump 7) is performed. In particular, the assist pressure increase section 106 increases the wheel cylinder hydraulic pressure by using the brake fluid which previously flows into and is stored in the stroke simulator 27 at the initial stage of the pressure increase of the wheel cylinder hydraulic pressure (in the above-described low pressure region). With this, it is not necessary that the master cylinder 5 (or the pump 7) supplies the brake fluid to the wheel cylinder 8 for closing the buca. That is, after the start of the supply of the brake fluid from the master cylinder 5 (or the pump 7) to the wheel cylinder 8 to a timing at which the braking force is really generated, the consumed fluid amount of the wheel cylinder 8 becomes small. Accordingly, it is possible to improve the response of the pressure increase of the wheel cylinder hydraulic pressure. In this sense, the assist pressure increase section 106 assist the pressure increase of the wheel cylinder hydraulic pressure by the master cylinder 5 (or the pump 7). Accordingly, the device 1 can improve the response of the pressure increase without using the high pressure accumulator, or without increasing the sizes of the pump 7 and the motor. For example, it is possible to ensure the sufficient braking force even at, for example, the sudden braking.

Besides, it is conceivable that a first fill mechanism is provided to the master cylinder 5 for filling the buca. The first fill mechanism uses a relief valve including a master cylinder piston 54P having a stepped shape. The first fill mechanism is arranged to vary the brake fluid amount supplied from the master cylinder 5 toward the hydraulic pressure unit 6 (the wheel cylinders 8), in accordance with the amounts of the pedal stroke, to increase the fluid amount supplied from the master cylinder 5 to the wheel cylinder 8 at the timing suddenly after the depression of the brake. However, in this case, the device has the structure in which the supply fluid amount from the master cylinder 5 is increased. The diameter of the piston 54 of the master cylinder 5 may be increased. On the other hand, in the embodiment, the brake fluid stored in the accumulator (the stroke simulator 27) is used for the filling the buca. Accordingly, it is not necessary that the supply fluid amount from the master cylinder 5 is increased. Consequently, it is possible to decrease the loss depression force, without varying the piston 54 of the master cylinder (for example, the small diameter is used without stepped shape).

The hydraulic pressure which can fill the buca is stored in the accumulator (the stroke simulator 27). Since this low pressure accumulator is sufficient, it is possible to suppress the size increase of the device 1. That is, the low pressure accumulator arranged to increase the pressure simply for filling the buca is sufficient, without the high pressure itself accumulator arranged to increase the pressure (also at the sudden braking) of the wheel cylinder hydraulic pressure. It is avoided that there is generated the problem to ensure the reliability of the guarantee of the durability of the accumulator. Moreover, there is little possibility that the size of the device 1 is increased, and that the weight of the device 1 is increased.

When the present applicant simulates the effect of filling the buca, in a case where the pressure of 0.2 MPa is accumulated in the stroke simulator 27 and this pressure is used as the assist pressure increase, it is decrease the time period during which the wheel cylinder hydraulic pressure is increased from 0 MPa to 8 MPa by 100 msec, relative to a case the pressure is not used as the assist pressure increase. Besides, the displacement of the stroke simulator 27 may be further increased, and the pressure greater than 0.2 MPa is accumulated. In this case, it is possible to further improve the pressure increase response. Besides, when the high pressure higher than the necessary pressure for filling the buca is supplied to the wheel cylinder 8, the braking force unintended by the driver may be generated. Accordingly, it is necessary to adjust the timing of ending the assist pressure increase, that is, the timing at which the stroke simulator valve 26 is controlled in the closing direction. Moreover, by the displacement increase of the stroke simulator 27, the size of device 1 may be increased. On the other hand, in this embodiment, the pressure of substantially 0.2 MPa, that is, the hydraulic pressure by which the buca can be filled, is accumulated to the stroke simulator 27. With this, it is possible to suppress the size increase of the device 1, and the weight increase of the device 1. Furthermore, it is unnecessary to adjust the timing of the ending the assist pressure increase. It is possible to simplify the configuration of the control.

Besides, from the initial stage of the braking (irrespective of the brake operation amount), the boost control may be performed. In this case, it is also possible to improve the response of the pressure increase of the wheel cylinder hydraulic pressure by the boost control (the pump up) by the assist pressure increase section 106. In particular, when the brake pedal 2 is operated, the pump 7 is operated by driving the motor M. Moreover, the valves 20, 21, and 26 are driven like FIG. 3 to flow the brake fluid within the stroke simulator 27 to the wheel cylinders 8. With this, while the hydraulic pressure is increased after the pump 7 actually discharges the brake fluid, the buca of the caliper can be filled to the extent. Accordingly, it is possible to improve the response of the pressure increase. On the other hand, like the present embodiment, when the depression force brake is attained at the initial stage of the braking in which the brake operation amount is relatively small, it is possible to improve the response of the pressure increase of the wheel cylinder hydraulic pressure by the depression force brake (the pedal depression operation), by the assist pressure increasing section 106. That is, while the brake fluid is started to be supplied to the wheel cylinders after the master cylinder 5 actually generates the hydraulic pressure, it is possible to fill the buca of the caliper to the extent. Consequently, it is possible to improve the response of the pressure increase of the depression force brake. Furthermore, the buca is filled (the consumed fluid amount is decreased). Accordingly, it is possible to suppress the stroke (the pedal stroke) of the piston 54 of the master cylinder 5 for obtaining the necessary wheel cylinder hydraulic pressure. With this, it is possible to improve the feeling of the brake operation, and to suppress the increase of the axial size of the master cylinder 5.

When the front and rear pipe system is employed, the first hydraulic passage 11P may be connected to the wheel cylinders 8 of the both front wheels FL and FR. Moreover, the assist pressure increase section 106 may control the connection valve 23S in the opening direction. That is, the brake fluid may supply the brake fluid of the stroke simulator 27 only to the wheel cylinders 8 of the front wheels FL and FR. In this case, it is possible to improve the response of the pressure increase of the wheel cylinder hydraulic pressures of at least the front wheels FL and FR. Moreover, it is possible to suppress the size of the stroke simulator 27 since the hydraulic pressure to be stored in the stroke simulator 27 for the assist pressure increase (filling the buca).

As the effects by the other structures, the boost control (the pressure increase and the pressure decrease of the wheel cylinder hydraulic pressure) can be continued by employing the reservoir 12a as the supply source and the discharge source of the brake fluid, at the failure at which the brake fluid is leaked from the suction hydraulic passage 12 at the portion of the pipe 10R. Accordingly, it is possible to improve the failsafe characteristic. Moreover, the second simulator hydraulic passage 17 is provided. Consequently, at the above-described failure, the stroke simulator 27 (the auxiliary chamber R2) can function as the supply source and the discharge source (the reservoir) of the brake fluid, like the above-described case. Therefore, it is possible to further improve the fail-safe characteristic. Besides, the auxiliary chamber R2 of the stroke simulator valve 26 needs not to be connected to the suction hydraulic passage 12. For example, the auxiliary chamber R2 may be directly released to the low pressure (the atmospheric pressure). Moreover, the normally-closed connection valve 23S is provided. The brake hydraulic pressure systems of the both systems can be independent from each other at the failure of the power source. In the respective systems, the wheel cylinder pressure increase can be independently performed by the depression force. Accordingly, it is possible to improve the fail-safe characteristic. Moreover, when the normally-closed pressure regulating valve 24 is at the open-failure, the wheel cylinder hydraulic pressure cannot be sufficiently regulated, and the wheel cylinder hydraulic pressure is released through the first pressure decrease hydraulic passage 14. It is difficult to hold the brake characteristic. Accordingly, the normally-open connection valve 23P is added as the means for sensing the open-failure of the pressure regulating valve 24. The opening states and the closing states of the connection valve 23S and the connection valve 23P are arbitrarily switched. The detection value of the hydraulic pressure sensor 93 according to the switching is monitored. With this, it is possible to sense the open failure of the pressure regulating valve 24. Consequently, it is possible to improve the fail-safe characteristics.

Hereinafter, effects of the brake device 1 of the first embodiment is described.

(1) The brake device 1 includes the master cylinder 5 which is connected through the first hydraulic passage 11 to the wheel cylinders 8, and which is arranged to increase the wheel cylinder hydraulic pressure; the pump 7 which is connected through the first hydraulic passage 11 to the wheel cylinder 8, and which is arranged to increase the wheel cylinder hydraulic pressure; and the assist pressure increasing section (the assist pressure increase section 106 and the stroke simulator 27) arranged to assist the pressure increase of the wheel cylinder hydraulic pressure by the master cylinder 5 or the pump 7. Accordingly, it is possible to improve the response of the pressure increase of the wheel cylinder hydraulic pressure (the response at the braking) by assisting the pressure increase of the wheel cylinder hydraulic pressure by the assist pressure increasing section. Moreover, it is unnecessary to use the high pressure accumulator, and to increase the sizes of the pump 7 and the motor M. Accordingly, it is possible to suppress the increase of the size of the device 1 and the increase of the weight of the device 1.

(2) In (1), the assist pressure increasing section includes the accumulator (the stroke simulator 27). Accordingly, this is a member to store (accumulate) the pressure. It is unnecessary to drive the hydraulic pressure source at each time.

(3) In (2), the accumulator is the stroke simulator 27 arranged to receive the brake fluid flowing out at least from the master cylinder 5 to the first hydraulic passage 11P, through the branch passage (the first simulator hydraulic passage 16) to the chamber (the main chamber R1), and thereby to generate the pedal stroke. Accordingly, the stroke simulator serves also as the accumulator. It is possible to suppress the increase of the size of the device 1, and the increase of the weight of the device 1.

(4) In (2), the device 1 includes brake pads which are disposed with the predetermined clearances (the buca) with respect to the rotors provided to the wheels FL-RR, and which is arranged to be moved by the wheel cylinders, and thereby to be abutted on the rotors to generate the braking force. The accumulator is the low pressure accumulator. The hydraulic pressure which can move the brake pads to fill the predetermined clearances are stored in the accumulator. Accordingly, by filling the predetermined clearances (the buca) by the supply of the brake fluid from the accumulator, it is possible to improve the response of the pressure increase of the wheel cylinder hydraulic pressure. Moreover, the accumulator may be the low pressure accumulator. Accordingly, it is possible to suppress the size increase of the device 1 and the weight increase of the device 1.

(5) In (4), the hydraulic pressure of substantially 0.2 MPa is accumulated in the accumulator. Accordingly, it is sufficient to accumulate the hydraulic pressure by which the buca is filled. Consequently, it is possible to suppress the size increase and the weight increase of the device 1.

(6) In (1), the device 1 includes the stroke simulator 27 which is arranged to receive the brake fluid flowing out from at least the master cylinder 5 through the hydraulic passage (the first simulator hydraulic passage 16) to the chamber (the main chamber R1), and thereby to generate the pedal stroke; the branch hydraulic passage (the first simulator hydraulic passage 16) which is bifurcated from the first hydraulic passage 11P, and which is connected to the stroke simulator 27; and the first shutoff valve (the MC valve 20) provided on the first hydraulic passage 11P between the master cylinder 5 and the stroke simulator 26. The assist pressure increase section 106 controls the first shutoff valve in the closing direction, and controls the stroke simulator valve 26 in the opening direction, so as to increase the pressure of the wheel cylinder hydraulic pressure by the brake fluid flowing into the stroke simulator 27. Accordingly, it is possible to increase the pressure of the wheel cylinder hydraulic pressure by using the brake fluid within the stroke simulator 27. Moreover, it is possible to smooth the assist pressure increase by shutting off between the stroke simulator 27 and the master cylinder 5.

(7) In (6), the device 1 includes the one-way valve (the check valve 210) arranged to allow the only flow in the direction from the master cylinder 5 to the wheel cylinder 8 when the first shutoff valve is closed. Accordingly, it is possible to suppress the stiff pedal feeling (the plate pedal feeling) even when the sudden depression and so on of the brake pedal 2 is performed, and to improve the pedal feeling.

(8) In (2), the brake fluid flows into the accumulator (the stroke simulator 27) by the brake operation of the driver. Accordingly, it is unnecessary to provide the hydraulic pressure source for flowing the brake fluid into the accumulator for the pressure accumulation.

(9) In (2), the brake fluid flowing out from the wheel cylinders 8 when the brake operation of the driver is finished flows into the accumulator (the stroke simulator 27). Accordingly, it is unnecessary to provide the hydraulic pressure source for flowing the brake fluid into the accumulator for the pressure accumulation.

(10) In (2), the accumulator (the stroke simulator 27) is connected to the first hydraulic passage 11P. The pressure can be accumulated in the accumulator by the pump 7. Accordingly, it is unnecessary to provide another hydraulic pressure source for flowing the brake fluid into the accumulator.

(11) In (2), the device 1 includes the pressure accumulation hydraulic passage (the first simulator hydraulic passage 16) connecting the accumulator (the stroke simulator 27) and the first hydraulic passage 11P, and the accumulator valve (the stroke simulator valve 26) provided in the pressure accumulation hydraulic passage. Accordingly, it is possible to further surely hold the hydraulic pressure accumulated in the accumulator.

(12) The device 1 includes the first hydraulic passage 11 connecting the master cylinder 5 and the wheel cylinders 8; the stroke simulator 27 which is arranged to receive the brake fluid flowing out at least from the master cylinder 5 through the hydraulic passage (the first simulator hydraulic passage 16) to the chamber (the main chamber R1), and thereby to generate the pedal stroke; the branch hydraulic passage (the first simulator hydraulic passage 16) which is bifurcated from the first hydraulic passage 11P, and which is connected to the stroke simulator 27; the stroke simulator valve 26 which is provided on the branch hydraulic passage; the first shutoff valve (the MC valve 20) which is provided on the first hydraulic passage 11P between the master cylinder 5 and the stroke simulator valve 26; and the assist pressure increase section 106 which is configured to control the first shutoff valve in the closing direction, to control the stroke simulator valve 26 in the opening direction, and to increase the wheel cylinder hydraulic pressure by the brake fluid flowing into the stroke simulator 27. Accordingly, it is possible to attain the same effects as (1)-(3), and (6).

(13) In (12), the device 1 includes the one-way valve (the check valve 210) which is provided in the first shutoff valve (the MC valve 20), and which is arranged to allow the only flow from the master cylinder 5 to the wheel cylinders 8 when the first shutoff valve is closed. Accordingly, it is possible to attain the same effect of (7).

(14) In (12), the device 1 includes the second shutoff valve 21P which is provided on the first hydraulic passage 11P between the wheel cylinders 8 and the stroke simulator valve 26. Accordingly, it is possible to attain the control by the brake-by-wire (the second system) while generating the pedal stroke by the stroke simulator 27.

(15) In (12), the device 1 includes the brake pads which are disposed with predetermined clearances (buca) with respect to the rotors provided to the wheels FL-RR, and which is arranged to be moved by the wheel cylinder hydraulic pressure, and thereby to be contacted on the rotor to generate the braking force. The hydraulic pressure to move the brake pads to fill the predetermined clearance is accumulated to the stroke simulator 27. Accordingly, it is possible to improve the response of the pressure increase of the wheel cylinder hydraulic pressure by filling the predetermined clearance (the buca) by the supply of the brake fluid from the stroke simulator 27.

(16) In (15), the hydraulic pressure of substantially 0.2 MPa is accumulated in the stroke simulator 27. Accordingly, it is possible to obtain the same effects as (5).

The device 1 includes the hydraulic passage (the first hydraulic passage 11P) of the primary system which includes a plurality of wheel cylinders 8a and 8d whose pressures are increased by the master cylinder pressure generated by the first chamber (the first fluid chamber 51P) of the master cylinder 5 that is arranged to generate the brake hydraulic pressure by the pedal operation of the driver; the hydraulic passage (the first hydraulic passage 11S) of the secondary system which include a plurality of wheel cylinders 8b and 8c whose the pressures are increased by the master cylinder pressure generated by the second chamber (the first fluid chamber 51S) of the master cylinder 5; the connection passage (the discharge hydraulic passage 13P and 13S) connecting the hydraulic passage of the primary system and the hydraulic passage of the secondary system; the pump 7 arranged to discharge the brake fluid to the connection passage; the first hydraulic passage 11 connecting the master cylinder 5 and the wheel cylinders 8; the stroke simulator 27 which is arranged to receive the brake fluid flowing out from at least the master cylinder 5 through the hydraulic passage (the first simulator hydraulic passage 16) within the chamber (the main chamber R1), and thereby to generate the pedal stroke; the branch passage (the first simulator hydraulic passage 16) which is bifurcated from the first hydraulic, and which is connected to the stroke simulator 27; the stroke simulator valve 26 which is provided in the branch hydraulic passage; the second shutoff valves 21 provided on the first hydraulic passage 11P of the primary system between the wheel cylinder 8 and the stroke simulator valve 26, and provided on the first hydraulic passage 11S of the secondary system between the wheel cylinders 8 and the master cylinder 5; the brake fluid storing means (the brake fluid storing section 107) arranged to store the brake fluid within the stroke simulator 27; the assist pressure increase means (the assist pressure increase section 106) configured to control the second shutoff valve 21P of the primary system in the open direction, to control the second shutoff valve 21S of the secondary system in the closing direction, to control the stroke simulator valve 26 in the opening direction, and thereby to increase the wheel cylinder hydraulic pressure by the brake fluid within the stroke simulator 27; and the depression force brake generating means (the depression brake generating section 103) configured, after the pressure increase by the auxiliary pressure increasing means, to control the second shutoff valve 21S of the secondary system in the opening direction, to control the stroke simulator valve 26 in the closing direction, and thereby to increase the wheel cylinder hydraulic pressures through the hydraulic passage (the first hydraulic passage 11S) of the secondary system and the connection passage (the discharge hydraulic passages 13P and 13S) by the pressure of the second chamber of the master cylinder 5.

Accordingly, it is possible to improve the response at the braking by the depression force brake by assisting the pressure increase by using the brake fluid within the stroke simulator 27. It is unnecessary to use the high pressure accumulator, and to increase the sizes of the pump 7 and the motor M. Accordingly, it is possible to suppress the increase of the size of the device 1, and the increase of the weight of the device 1. Moreover, it is possible to smoothly perform the assist pressure increase by shutting off between the wheel cylinder 8 of the secondary system and the master cylinder 5.

(18) In (17), the device 1 includes the first shutoff valve (the MC valve 20) which his provided on the first hydraulic passage 11P between the master cylinder 5 and the stroke simulator valve 26; and the boost control switching means (the boost control switching section 105) configured to switch the depression force brake by the depression force brake generating means (the depression force brake generating section 103) to the boost control by the pump 7. The boost control switching means is configured to control the first shutoff valve in the closing direction, and to drive the pump 7.

Accordingly, it is possible to attain the switching from the depression force brake to the boost control while suppressing the variation of the pedal stroke.

(19) In (17), the brake fluid storing means (the brake fluid storing section 107) is configured to control the stroke simulator valve 26 in the opening direction, and to store the brake fluid within the wheel cylinders 8 within the stroke simulator 27.

Accordingly, it is possible to readily store the brake fluid within the stroke simulator 27 after the end of the depression force brake.

(20) In (19), the device 1 includes the master cylinder pressure sensor (the hydraulic pressure sensor 91) arranged to sense the pressure of the master cylinder 5; and the brake fluid storing means (the brake fluid storing means 107) is configured to control the stroke simulator valve 26 in the closing direction when the brake pedal 2 is returned, and the sensed pressure of the master cylinder 5 becomes equal to or smaller than the predetermined pressure.

Accordingly, it is possible to readily accumulate the pressure within the stroke simulator 27.

Second Embodiment

The brake device 1 according to the second embodiment uses another accumulator 29 as the low pressure accumulator for assisting the pressure increase of the wheel cylinder hydraulic pressure immediately after the pedal depression, without using the stroke simulator 27, unlike the first embodiment. Hereinafter, the structures which are different from those of the first embodiment are illustrated. The explanations of structures identical to those of the first embodiment are omitted by using the same symbols.

Figure 12:
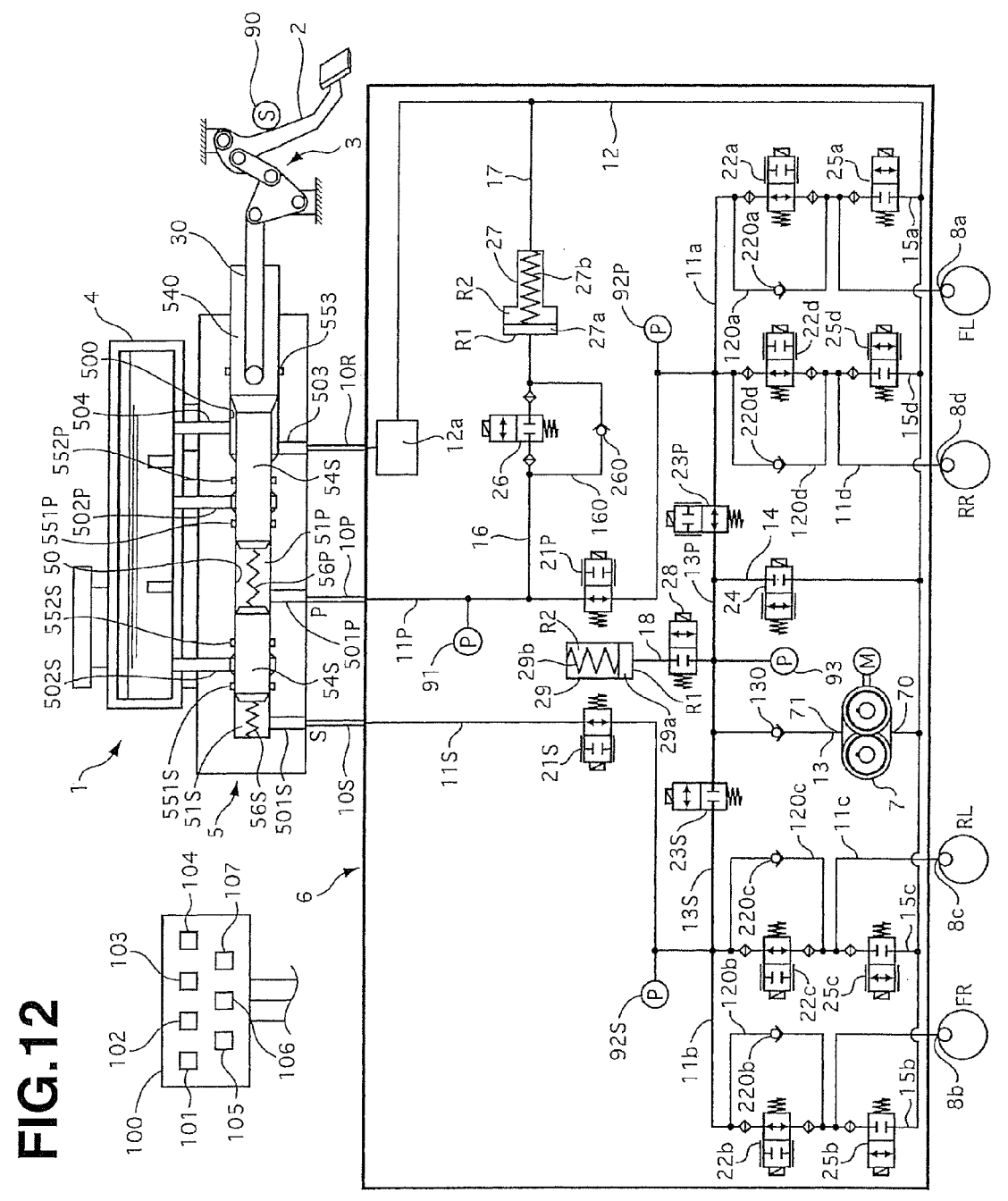

First, the configuration is illustrated. FIG. 12 is a view showing a schematic structure of the brake device 1 of the second embodiment, with the hydraulic pressure circuit of the hydraulic pressure unit 6. The cylinder 50 of the master cylinder 5 includes an opening portion which is on the brake pedal 2's side, and which has a large diameter. A resupply port 504 and a suction port 503 are provided to this large diameter portion of the cylinder 50. The piston 54P of the P system includes a large diameter portion on which the push rod 30 is mounted, and which has a large diameter. This large diameter portion of the piston 54P is received within the large diameter portion of the cylinder 50. The MC valve 20 is not provided on the first hydraulic passage 11P of the hydraulic pressure unit 6 between the master cylinder 5 and the stroke simulator valve 26. The bypass hydraulic passage 111 of the first embodiment to bypass the shutoff valve 21 is not provided. The check valve 211 of the first embodiment is not provided. The hydraulic pressure sensor 91 arranged to sense the master cylinder pressure is not provided on the first simulator hydraulic passage 16. The hydraulic pressure sensor 91 is provided on the first hydraulic passage 11P between the master cylinder 5 and the shutoff valve 21P. A bypass hydraulic passage 160 is provided in parallel with the first simulator hydraulic passage 16 to bypass the stroke simulator valve 26. A check valve 260 is provided on the bypass hydraulic passage 160. The check valve 260 is arranged to allow the only flow of the brake fluid from the stroke simulator 27's side to the first hydraulic passage 11P's side.

The accumulator 29 includes a piston 29a which separates (divides) the chamber R into two chambers (a main chamber R1 and an auxiliary chamber R2), and which is arranged to be moved within the chamber R in the axial direction; and a spring 29b which is an elastic member that is disposed in a compressed state within the auxiliary chamber R2, and that is arranged to constantly urge the piston 29a toward the main chamber R1's side (in a direction to decrease the volume of the main chamber R1, and to decrease the volume of the auxiliary chamber R2). The accumulator hydraulic passage 18 is provided on the discharge hydraulic passage 13P to be bifurcated from a portion between the discharge portion 71 (the check valve 130) and the connection valve 23P. The accumulator hydraulic passage 18 is connected to the main chamber R1 of the accumulator 29. In this embodiment, for the simplification of the structure, the auxiliary chamber R2 of the accumulator 29 is released (opened) to the low pressure (atmospheric pressure). The accumulator may have the closed structure like the general accumulator. The accumulator is not limited to the specific structure. The accumulator valve 28 which is the accumulator shutoff valve is provided on the accumulator hydraulic passage 18. The accumulator valve 28 is a normally-closed ON/Off valve. The accumulator hydraulic passage 18 is connected to the discharge hydraulic passage 13 which is a connection passage connecting the hydraulic passage (the first hydraulic passage 11P) of the P system and the hydraulic passage (the first hydraulic passage 11S) of the S system. The accumulator hydraulic passage 18 connects the accumulator 29 (the main chamber R1) to the first hydraulic passage 11 through the discharge hydraulic passage 13. The accumulator 29 is connected through the connection passage (the discharge hydraulic passage 13) and the first hydraulic passage 11 to the wheel cylinders 8a-8d. The accumulator 29 is a hydraulic pressure source arranged to supply the brake fluid to the connection passage (the discharge hydraulic passage 13), and thereby to increase the wheel cylinder hydraulic pressure.

In this embodiment, the accumulator 29 is a low pressure accumulator arranged to accumulate (store the pressure) the hydraulic pressure having the relatively low pressure. The auxiliary pressure increasing section 106 is configured to increase the wheel cylinder hydraulic pressure by using the brake fluid (accumulated hydraulic pressure) flowing into the accumulator 29 (the main chamber R1), and thereby to assist the pressure increase of the wheel cylinder hydraulic pressure by the master cylinder 5 or the pump 7. In particular, the auxiliary pressure increasing section 106 is configured to control the shutoff valve 21 in the closing direction, and to control the accumulator valve 28 in the opening direction. For the assist pressure increase, the hydraulic pressure by which the brake pads are moved to fill the predetermined clearance (the buca) between the brake pads and the brake disc, for example, substantially 0.2 MPa is accumulated in the accumulator 29. Besides, the displacement of the accumulator 29 can be set to a displacement by which the initial increase (the pressure increase response) of the wheel cylinder hydraulic pressure is improved, and by which the increase of the sizes of the pump 7 and the motor M are suppressed (for example, the hydraulic pressure equal to or smaller than 0.5 MPa, the fluid amount of 1-2 cc). The accumulator hydraulic passage 18 connecting the accumulator 29 and the discharge hydraulic passage 13 functions as the pressure accumulating hydraulic passage for accumulating the hydraulic pressure within the accumulator 29. That is, the brake fluid from the discharge hydraulic passage 13 is supplied through the accumulator hydraulic passage 18 to the accumulator 29. With this, it is possible to accumulate the pressure. The accumulator valve 28 is actuated in the closing direction so as to further surely hold the hydraulic pressure accumulated in the accumulator 29. For the pressure accumulation of the accumulator 29, like the first embodiment, the brake fluid from the wheel cylinder 8 may flow into the accumulator 29 when the brake operation of the driver is finished. Moreover, the pump 7 may be driven, and the brake fluid discharged from the pump 7 may flow into the accumulator 29. Besides, the connection portion of the accumulator hydraulic passage 18 (the accumulator 29) is arbitrary as long as the connection portion of the accumulator hydraulic passage 18 is on the wheel cylinder 8's side of the shutoff valve 21. In this embodiment, the accumulator hydraulic passage 18 is connected to the discharge hydraulic passage 13 between the connection valve 23P and the connection valve 23S. With this, it is possible to further rapidly accumulate the brake fluid from the pump 7. Moreover, the pump 7 is actuated in a state where the connection valves 23P and 23S are controlled in the closing direction, and the accumulator valve 28 is controlled in the opening direction. With this, it is possible to accumulate the pressure in the accumulator 29 without generating the hydraulic pressure in the wheel cylinder 8. That is, it is possible to perform the pressure accumulation without generating the unnecessary braking force. Accordingly, for example, during the running state of the vehicle, the pressure accumulation operation is previously performed when the braking operation by the driver is not performed. With this, it is ready for the subsequent braking.

Next, the effects and the operations are illustrated. The device 1 of this embodiment uses another low pressure accumulator 29 for assisting the pressure increase of the wheel cylinder hydraulic pressure immediately after the depression of the pedal, without using the stroke simulator 27 like the first embodiment. With this, it is possible to readily attain the control by the brake-by-wire (the second system). That is, in a case where the stroke simulator 27 provided on the master cylinder 5's side of the shutoff valve 21 is used as the low pressure accumulator like the first embodiment, the functions of the stroke simulator 27 are switched between the assist pressure increase of the wheel cylinder hydraulic pressure and the inherent generation of the pedal stroke. Accordingly, the MC valve 20 is needed. Moreover, when the shutoff valve 21 is provided in parallel with the check valve 211 like the first embodiment for suppressing the deterioration of the feeling while the pedal stroke is not generated by the stroke simulator 27 during the assist pressure increase, the flow of the brake fluid from the master cylinder 5's side through the check valve 211 to the wheel cylinder 8's side is allowed not only during the assist pressure increase. The control by the brake-by-wire may not be readily attained. On the other hand, in this embodiment, the MC valve 20 like the first embodiment is not needed by using the another low pressure accumulator 29 which is provided on the wheel cylinder 8's side of the shutoff valve 27 for the assist pressure increase. Moreover, it is possible to independently actuate the low pressure accumulator 29 and the stroke simulator 27. Accordingly, it is unnecessary to provide the check valve 211 in parallel with the shutoff valve 21 for suppressing the deterioration of the feeling during the assist pressure increase. Consequently, it is possible to readily attain the smooth control by the brake-by-wire.

The accumulator 29 is provided specifically for the assist pressure increase of the wheel cylinder hydraulic pressure. The accumulator 29 is sufficient to accumulate the low pressure. The capacity of the accumulator 29 is sufficient, for example, by the hydraulic pressure equal to or smaller than 0.5 MPa, and the fluid amount of 1-2 cc. Consequently, it is possible to decrease the size of the accumulator 29. For example, the accumulator can be installed within the hydraulic pressure unit 6. Accordingly, it is possible to suppress the increase of the size of the device 1, and the increase of the weight of the device 1. Moreover, it is possible to avoid that there is generated the problem to ensure the durability guarantee of the accumulator and the reliability of the accumulator.

The bypass hydraulic passage 160 and the check valve 260 of the stroke simulator valve 26 have the fail-safe function. In particular, when the brake pedal 2 is depressed in a state where the shutoff valve 21 is closed, and the connection between the master cylinder e5 and the wheel cylinders 5 are shut off, the brake fluid is sucked from the master cylinder 5 to the stroke simulator 27. In this case, in a case where the power supply failure is generated when the brake fluid is discharged from the wheel cylinders 8 through the suction hydraulic passage 12 to the reservoir 4 by the control of the wheel cylinder hydraulic pressures, the normally-closed simulator shutoff valve 26 is closed to close the brake fluid within the stroke simulator 27. Consequently, by the only brake fluid remained within the master cylinder 5, it may be insufficient to increase the pressure of the wheel cylinder 8 again. That is, the sufficient braking force cannot be obtained. On the other hand, in this embodiment, in a state where the simulator shutoff valve 26 is closed, the brake fluid within the stroke simulator 27 (the main chamber R1) can be returned through the bypass hydraulic passage 160 to the first hydraulic passage 11p. Accordingly, it is possible to dissolve the above-described problems.

Moreover, the device 1 according to the second embodiment has the structure identical to those of (1), (2), (4), (5), (9), (10), and (11). Accordingly, it is possible to attain the same effects.

Third Embodiment

The brake device 1 according to the third embodiment uses a variable displacement chamber 29 having a piston 29a, for assisting the pressure increase of the wheel cylinder hydraulic pressure immediately after the pedal depression, in place of using the pressure accumulation means like the first and second embodiments. Hereinafter, the structure which are different from the second embodiment are illustrated. The explanations of the structures identical to those of the second embodiment are omitted by adding the same symbols.

Figure 13:
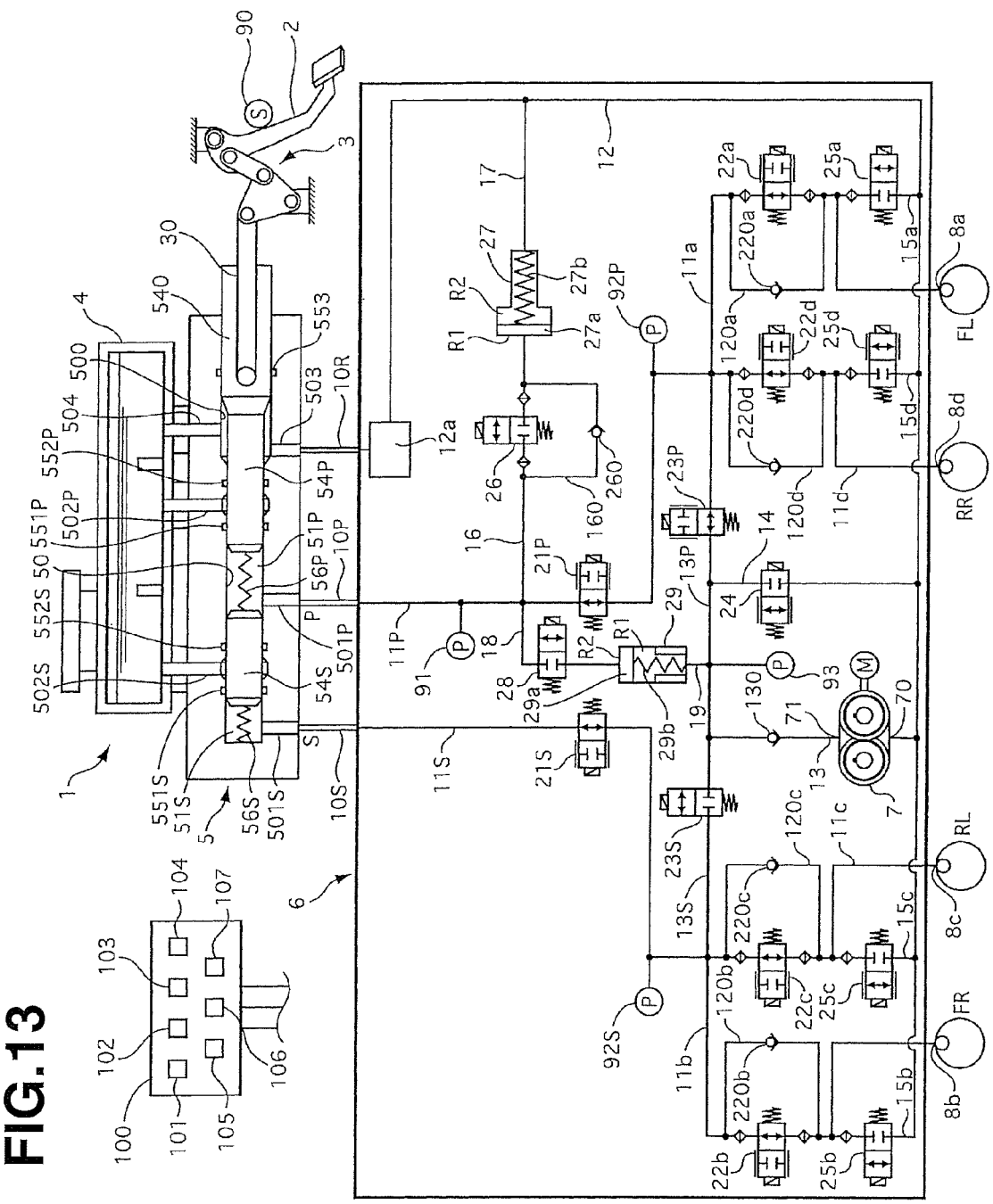
FIG. 13 is a schematic configuration view showing a brake device according to a third embodiment.

First, structures is illustrated. FIG. 13 is a view showing a schematic structure of the brake device 1 of the third embodiment, with a hydraulic circuit of the hydraulic pressure unit 6. The variable displacement chamber 29 includes a piston 29a which divides the chamber R into two chambers (a main chamber R1 and an auxiliary chamber R2), and which is arranged to be moved within the chamber R in the axial direction; and a spring 29b which is disposed in a compressed state, and which is an elastic member that is arranged to constantly urge the piston 29a on the auxiliary chamber R2's side (in a direction to decrease the volume of the auxiliary chamber R2, and to increase the volume of the main chamber R1). The master cylinder side hydraulic passage 18 is provided to be bifurcated from the first hydraulic passage 11P between the master cylinder 5 and the shutoff valve 21P. The master cylinder side hydraulic passage 18 is connected to the auxiliary chamber R2 of the variable displacement chamber 29. Besides, the master cylinder side hydraulic passage 18 may be bifurcated from the second hydraulic passage 11S between the master cylinder 5 and the shutoff valve 21S. The stroke shutoff valve 28 is provided on the master cylinder side hydraulic passage 18. The stroke shutoff valve 28 is a normally-closed ON/OFF valve. The stroke shutoff valve 28 is closed to shut off the master cylinder side hydraulic passage 18, to close the brake fluid within the auxiliary chamber R2. With this, the stroke (movement) of the piston 29a is restricted. The wheel cylinder side hydraulic passage 19 is provided to be bifurcated from the discharge hydraulic passage 13P between the discharge portion 71 of the pump 7 (the check valve 130) and the connection valve 23P. The wheel cylinder side hydraulic passage 19 is connected to the main chamber R1 of the variable displacement chamber 29. The variable displacement chamber 29 (the main chamber R1) is connected to the wheel cylinders 8a-8d through the wheel cylinder side hydraulic passage 19, the discharge hydraulic passage 13, and the first hydraulic passage 11.

After the depression of the pedal, the assist pressure increase section 106 controls the stroke simulator valve 26 and the shutoff valve 21P in the closing direction, and controls the stoke shutoff valve 28 in the opening direction. Accordingly, the brake fluid from the master cylinder 5 flows through the first hydraulic passage 11P and the master cylinder side hydraulic passage 18 to the auxiliary chamber R2 of the variable displacement chamber 29. When the pressure of the auxiliary chamber R2 is increased, the piston 29a is stroked (moved) to push the brake fluid out (from) the main chamber R1, so as to supply the brake fluid through the wheel cylinder side hydraulic passage 19, the discharge hydraulic passage 13, and the first hydraulic passage 11 to the wheel cylinders 8a-8d. The variation amount of the volume of the main chamber R1 by the stroke of the piston 29a is set to, for example, an amount corresponding to the hydraulic pressure (for example, substantially 0.2 MPa) by which the brake pad is moved to fill the predetermined clearance between the brake pad and the brake disk. After the predetermined brake fluid amount (the hydraulic pressure) is supplied from the variable displacement chamber 29 (the main chamber R1) to the wheel cylinders 8a-8d, the stroke shutoff valve 28 is controlled in the closing direction. Besides, when the stroke of the piston 29a is mechanically restricted (by the stopper and so on), the brake fluid amount (the hydraulic pressure) equal to or greater than the predetermined value is not transmitted to the wheel cylinder 8. Accordingly, the stroke of the piston 29a may be mechanically restricted to the amount corresponding to, for example, the hydraulic pressure by which the above-described clearance is filled. In this case, the stroke shutoff valve may be substantially omitted. The brake fluid transmitted from the master cylinder 5 to the variable displacement chamber 29 (the auxiliary chamber R2) for the assist pressure increase is returned to the master cylinder 5's side of the shutoff valve 21P in a state where the shutoff valve 21P is closed, after the assist pressure increase. Accordingly, the balance (the income and outgo) of the fluid amount is balanced.

The device 1 according to the third embodiment can obtain the same effect by the same structure as (1). By the supply of the brake fluid from the variable displacement chamber 29 (the main chamber R1), it is possible to improve the response of the pressure increase of the wheel cylinder hydraulic chamber. Moreover, the variable displacement chamber 29 having the small displacement is sufficient. It is possible to suppress the size increase of the device 1 and the weight increase of the device 1. Furthermore, the variable displacement chamber 29 is actuated by the brake fluid transmitted from the master cylinder 5 by the brake depression operation of the driver. Accordingly, the another hydraulic pressure source for flowing the brake fluid into the variable displacement chamber 29 (the auxiliary chamber R2) is not needed. The shutoff valve 21P is provided on the first hydraulic passage 11P between the wheel cylinder 8 and the stroke simulator valve 26. The master cylinder side hydraulic passage 18 is bifurcated in the first hydraulic passage 11P on the master cylinder 5's side of the shutoff valve 21P. Accordingly, it is possible to improve the response of the pressure increase by this control while attaining the control by the brake-by-wire (the second system). For example, when the boost control is performed from the initial stage of the braking in which the brake operation amount is relatively small, it is possible to improve the response of the pressure increase of the wheel cylinder hydraulic pressure by the pump 7 by filling the brake fluid supply from the variable displacement chamber 29 (the main chamber R1) within the predetermined clearance (the buca).

Other Embodiments

Hereinbefore, embodiments to attain the present invention are illustrated with reference to examples. However, the concrete structure of the present invention is not limited to the embodiments. Variations and so on of the design may be included within a range to be deviated from the gist of the present invention. For example, the brake apparatus to which the auxiliary pressure increase means according to the present invention is applied is not limited to the embodiments as long as the brake apparatus includes the hydraulic passage connecting the master cylinder and the wheel cylinder, and the pump connected to the wheel cylinder, and arranged to increase the pressure of the wheel cylinder hydraulic pressure. Moreover, the method of operating the actuations for controlling the wheel cylinder hydraulic pressures are not limited to the method of the embodiments. The method can be arbitrarily varied. Furthermore, in the embodiment, the boot control is mainly illustrated as example. It is identical in the regenerative cooperative braking control and so on.

EXPLANATION OF SYMBOLS 1 brake device
5 master cylinder
7 pump
8 wheel cylinder
11 first hydraulic passage
16 first simulator hydraulic passage (branch hydraulic passage)
20 MC valve (first shutoff valve)
26 stroke simulator valve
27 stroke simulator valve (accumulator, auxiliary pressure increasing portion)
106 auxiliary pressure increasing portion
R1 main chamber

The invention claimed is:
1. A brake device comprising:
a master cylinder arranged to be operated by a brake operation of a driver, to be connected through a first hydraulic passage to a wheel cylinder, and to increase a wheel cylinder hydraulic pressure;
a pump connected through the first hydraulic passage to the wheel cylinder, and arranged to increase the wheel cylinder hydraulic pressure; and
an auxiliary pressure increasing section arranged to assist a pressure increase of the wheel cylinder hydraulic pressure by the master cylinder or the pump, wherein the auxiliary pressure increasing section includes an accumulator,
the brake device further comprises
a stroke simulator arranged to generate a pedal stroke at least by the brake fluid flowing from the master cylinder into a chamber of the stroke simulator,
a branch hydraulic passage bifurcated from the first hydraulic passage and connected to the stroke simulator,
a stroke simulator valve provided in the branch hydraulic passage, and
a first shutoff valve provided in the first hydraulic passage between the master cylinder and the stroke simulator valve, and
the auxiliary pressure increasing section is configured to control the first shutoff valve in a closing direction, to control the stroke simulator valve in an opening direction, and thereby to increase a wheel cylinder hydraulic pressure by the brake fluid flowing into the stroke simulator.

2. The brake device as claimed in claim 1, where the brake device includes a brake pad disposed with a predetermined clearance with respect to a rotor provided to a wheel, and arranged to be moved by the wheel cylinder hydraulic pressure, and to contact on the rotor to generate a braking force; the accumulator is a low pressure accumulator; and the accumulator stores a predetermined hydraulic pressure which close the predetermined clearance by moving the brake pad.

3. The brake device as claimed in claim 2, wherein the accumulator stores a hydraulic pressure of substantially 0.2 MPa.

4. The brake device as claimed in claim 1, wherein the first shutoff valve includes a one-way valve arranged to allow only a flow from the master cylinder to the wheel cylinder when the first shutoff valve is closed.

5. The brake device as claimed in claim 1, wherein the brake fluid flows into the accumulator by operation of the driver.

6. The brake device as claimed in claim 1, wherein the brake fluid flowing out from the wheel cylinder at end of the operation of the driver flows into the accumulator.

7. The brake device as claimed in claim 1, wherein the accumulator is connected to the first hydraulic passage; and the pump increases a pressure of the accumulator.

8. The brake device as claimed in claim 1, wherein the brake device further comprises a pressure storing hydraulic passage connecting the accumulator and the first hydraulic passage, and an accumulator valve provided in the pressure storing hydraulic passage.

9. A brake device comprising:
a first hydraulic passage connecting a master cylinder and a wheel cylinder;
a stroke simulator arranged to generate a pedal stroke at least by that a brake fluid flowing out from at least the master cylinder through a hydraulic passage into an inside of a chamber;
a branch hydraulic passage which is bifurcated from the first hydraulic passage, and which is connected to the stroke simulator;
a stroke simulator valve provided in the branch passage;

a first shutoff valve provided on the first hydraulic passage between the master cylinder and the stroke simulator valve; and an auxiliary pressure increasing section configured to control the first shutoff valve in a closing direction, to control the stroke simulator valve in an opening direction, and thereby to increase the wheel cylinder hydraulic pressure by the brake fluid flowing into the stroke simulator.

10. The brake device as claimed in claim 9, wherein the first shutoff valve includes a one-way valve arranged to allow only a flow in a direction from the master cylinder to the wheel cylinder when the first shutoff valve is closed.

11. The brake device as claimed in claim 10, wherein the brake device includes a brake pad disposed with a clearance with respect to a rotor provided to a wheel, and arranged to be moved by the wheel cylinder hydraulic pressure, and to contact on the rotor to generate a braking force; the accumulator is a low pressure accumulator; and the accumulator stores a predetermined hydraulic pressure which close a predetermined clearance by moving the brake pad.

12. The brake device as claimed in claim 11, wherein the accumulator stores a hydraulic pressure of substantially 0.2 MPa.

13. The brake device as claimed in claim 9, wherein the brake device further comprises a second shutoff valve provided on the first hydraulic passage between the wheel cylinder and the stroke simulator.

14. A brake device comprising:
a hydraulic passage of a primary system which is provided with a plurality of wheel cylinders whose pressures are increased by master cylinder pressures generated in a first chamber of a master cylinder arranged to generate a brake hydraulic pressure by a pedal operation of a driver;
a hydraulic passage of a secondary system which is provided with a plurality of wheel cylinders whose pressures are increased by the master cylinder pressures generated by a second chamber of the master cylinder;
a connection passage connecting the hydraulic passage of the primary system and the hydraulic passage of the secondary system;
a pump arranged to discharge the brake fluid to the connection passage;
a stroke simulator arranged to generate a pedal stroke at least by that the brake fluid flowing out from the master cylinder flows through the hydraulic passage to an inside of the chamber;
a branch passage which is bifurcated from the first hydraulic passage of the primary system, and connected to the stroke simulator;
a stroke simulator valve provided in the branch passage;
a second shutoff valve provided on the first hydraulic passage of the primary system between the wheel cylinder and the stroke simulator valve, and provided on the first hydraulic passage of the secondary system between the wheel cylinder and the master cylinder;
a brake fluid storing section configured to store the brake fluid within the stroke simulator;
an auxiliary pressure increasing section configured to control the second shutoff valve of the primary system in an opening direction, to control the second shutoff valve of the secondary system in a closing direction, to control the stroke simulator in an opening direction, and thereby to increase the wheel cylinder hydraulic pressure by the brake fluid within the stroke simulator; and
a depression force brake generating section configured to control the second shutoff valve of the secondary system in the opening direction after the pressure increase by the auxiliary pressure increasing section, to control the stroke simulator valve in the closing direction, and to increase the wheel cylinder hydraulic pressure through the hydraulic pressure of the secondary system and the connection passage by the pressure of a second chamber of the master cylinder.

15. The brake device as claimed in claim 14, wherein the brake fluid storing section is configured to control the stroke simulator valve in an opening direction, and to store the brake fluid within the wheel cylinder to the stroke simulator.

16. The brake device as claimed in claim 15, wherein the brake device further includes a master cylinder pressure sensor configured to sense a pressure of the master cylinder; and the brake fluid storing section is configured to control the stroke simulator valve in a closing direction when the brake pedal is returned and the sensed pressure of the master cylinder becomes equal to or smaller than a predetermined pressure.

17. The brake device as claimed in claim 14, wherein the brake device further includes a first shutoff valve provided in the first hydraulic passage between the master cylinder and the stroke simulator valve, and a boost control switching section configured to switch from a depression force brake by the depression force brake generating section to a boost control by the pump.

* * * * *